United States Patent [19]
Schipper

[11] Patent Number: 5,986,603
[45] Date of Patent: Nov. 16, 1999

[54] GEOMETRIC UTILIZATION OF EXACT SOLUTIONS OF THE PSEUDORANGE EQUATIONS

[75] Inventor: John F. Schipper, Palo Alto, Calif.

[73] Assignee: Trimble Navigation Limited, Sunnyvale, Calif.

[21] Appl. No.: 08/780,880

[22] Filed: Jan. 9, 1997

Related U.S. Application Data

[63] Continuation-in-part of application No. 08/599,939, Feb. 14, 1996.

[51] Int. Cl.⁶ .............................. H04B 7/185; G01S 5/02
[52] U.S. Cl. ............................................ 342/357; 701/213
[58] Field of Search ............................. 342/357; 701/213, 701/214

[56] References Cited

U.S. PATENT DOCUMENTS

| | | | |
|---|---|---|---|
| 4,463,357 | 7/1984 | MacDoran | 343/460 |
| 4,894,662 | 1/1990 | Counselman | 342/357 |
| 4,918,609 | 4/1990 | Yamawaki | 364/449 |
| 4,972,431 | 11/1990 | Keegan | 375/1 |
| 5,017,926 | 5/1991 | Ames et al. | 342/353 |
| 5,111,209 | 5/1992 | Toriyama | 342/357 |
| 5,146,231 | 9/1992 | Ghaem et al. | 342/419 |
| 5,148,179 | 9/1992 | Allison | 342/357 |
| 5,266,958 | 11/1993 | Durboraw, III | 342/357 |
| 5,323,163 | 6/1994 | Maki | 342/357 |
| 5,323,322 | 6/1994 | Mueller et al. | 364/449 |
| 5,359,521 | 10/1994 | Kyrtsos et al. | 364/449 |
| 5,390,124 | 2/1995 | Kyrtsos | 342/357 |

OTHER PUBLICATIONS

Tom Logsdon, "The Navstar Global Positioning System," pp. 1–91, Van Nostrand Reinhold, 1992.

"Navstar GPS Space Segment/Navigation User Interfaces," Interface Control Document GPS(200), No. ICD–GPS–200, Rockwell International, Satellite Systems Division, Rev. B–PR, IRN–200B–PR–001, Apr. 16, 1993.

Alfred Leick, "GPS Satellite Surveying," 2nd edition, pp. 247–285, John Wiley & Sons, Jan. 1995.

*Primary Examiner*—Theodore M. Blum
*Attorney, Agent, or Firm*—John F. Schipper

[57] ABSTRACT

Method and apparatus for determining non-iterative exact solutions for two, three or four location fix coordinates x, y, z and/or time offset b from pseudorange measurements from a plurality of location determination (LD) signals received at a GPS or GLONASS station. If M location fix coordinates are to be determined from N pseudorange measurements, the solution is exact if N=M. If N=M−1, the solution for two of the location fix coordinates lies at a point, on an ellipse or on an hyperbola. If N≧M+1, a solution lies at the center of a sphere in M-dimensional space or in the interior of the sphere, according as N=M+1 or N≧M+2.

35 Claims, 5 Drawing Sheets

GEOMETRIC UTILIZATION OF EXACT SOLUTIONS OF THE PSEUDORANGE EQUATIONS

FIELD OF THE INVENTION

This application is a continuation-in-part of U.S. Ser. No. 08/599,939, filed on Feb. 14, 1996 and assigned to the same assignee. The invention relates to utilization of measurements of signals received from a location determination system, such as a Satellite Positioning System.

BACKGROUND OF THE INVENTION

Time delays associated with timed signals received from location determination (LD) signal sources, such as satellites in a Global Positioning System (GPS), Global Orbiting Navigation Satellite System (GLONASS), or other Satellite Positioning System (SATPS), or such as ground-based signal towers in a Loran system, are used to estimate the distance of each LD signal source from the LD receiver of such signals. In a conventional approach, a time delay associated with the LD signal received from each satellite is determined and expressed in code phase as a pseudorange value. The pseudorange values are modeled as arising from the line-of-sight (LOS) distance from the satellite to the LD receiver, plus additive terms due to additional time delays arising from propagation of the signal through the ionosphere and through the troposphere, multipath signal production and propagation, and other perturbations. These perturbations are often estimated and approximately removed by modeling the effects of such perturbations. The modeled pseudorange value for each satellite, with or without these perturbations removed, includes a square root term that models the as-yet-unknown LOS Euclidean distance. A solution for this system of pseudorange equations involves the three spatial coordinates (x,y,z) for the LD receiver and the absolute time t (or time offset b) at which the pseudorange values were measured. A solution for location fix coordinates (x,y,z,b) is usually estimated by iterative estimation of the system of equations or by linearized that received the originally transmitted signal. Time errors for the station clocks are estimated and used to synchronize the station clocks and to determine the mobile station location, if the satellite locations are known accurately. Toriyama discloses a related approach in U.S. Pat. No. 5,111,209, in which timed signals are transmitted by a fixed reference station, with known location, through two geostationary satellites to the mobile station.

A method for obtaining pseudorange measurements from encrypted P-code signals, received from GPS satellites, is disclosed by Keegan in U.S. Pat. No. 4,972,431. Use of these pseudorange measurements to obtain the location of the GPS signal receiver is not discussed in much detail.

Ames et al, in U.S. Pat. No. 5,017,926, disclose a trilateralization method for estimating the location of an LD receiver on a known surface, such as the Earth's surface, using LD signals received from two satellites with known locations and from a fictitious satellite located at the Earth's center.

In U.S. Pat. No. 5,148,179, Allison discloses use of double differences of pseudorange measurements and carrier phase measurements between first and second GPS signal receivers (one reference, one mobile) and N ($\geq 4$) GPS satellites to determine location coordinates for a first GPS receiver. The GPS reference receiver must have known location coordinates, and this approach produces N−1 non-linear equations that must be solved for the location coordinates and other variables.

A direction indicating system that receives and analyzes pseudorange and carrier phase signals from GPS satellites is disclosed by Durboraw in U.S. Pat. No. 5,266,958. Pseudorange signals are received at a mobile receiver and used in a conventional manner to determine receiver location. The receiver is then moved in a closed path in a selected direction, and carrier phase measurements are analyzed to provide direction parameters, such as azimuthal angle. Another direction finder, which uses a GPS estimation of the desired solution, using a known "exact" solution $(x_n, y_n, z_n, b_n)$ for this group of satellites that is in some sense "near" the desired solution. If this system of pseudorange equations is overdetermined, because N>4 independent pseudorange values are measured, the choice of solution of this system must somehow be optimized with respect to one or more criteria related to statistical and/or geometric attributes of the pseudorange measurements.

Static error as well as drift or dynamic error in a satellite clock can be monitored and corrected for quite accurately as time changes. Static error in a receiver clock, often referred to as "clock offset," is often determined as one of the unknowns. This approach ignores the possibility that receiver error is dynamic and changes with the passage of time.

Several workers have worked with or manipulated pseudorange or a similar variable in determining the distance from a satellite, whose location as a function of time is known, to a location on or near the Earth's surface whose location coordinates are not yet known.

Counselman, in U.S. Pat. No. 4,894,662, discusses some of the problems encountered in acquiring a lock on LD signals received from GPS satellites and making accurate pseudorange measurements and discusses filtering techniques that are suitable to obtain such measurements.

U.S. Pat. No. 4,918,609, issued to Yamawaki, discloses a system that uses two geosynchronous satellites and a mobile station, referred to collectively as "stations" here, on or near the Earth's surface, each being equipped with a transmitter, receiver, antenna and clock for communication with each other. One or both satellites and the mobile station emit range-finding signals that are received by the other two stations, and each station responds by transmission of its own range-finding signal. After each station has received the response signal from the other station or stations, the receiving station determines the total time for propagation of its own transmitted signal and for propagation of the response signal from a station omnidirectional antenna, a GPS receiver, and a directional antenna, is disclosed by Ghaem et al in U.S. Pat. No. 5,146,231.

Maki discloses use of GPS Dilution Of Precision (DOP) parameters for each visible four-satellite constellation to analyze and assign weights to the location solutions obtained for each of these constellations, in U.S. Pat. No. 5,323,163. A least squares location solution, based on the DOP-weighted four-satellite locations, is found for the GPS receiver location.

Use of a network of differential GPS reference stations to measure and construct a plurality of iso-pseudorange-correction (iso-PRC) contours associated with each visible GPS satellite is disclosed in U.S. Pat. No. 5,323,322, issued to Mueller et al. The iso-PRC contours for all visible satellites are then used to provide mathematical approximations for the differential corrections applicable to pseudorange measurements made at any location served by this network.

U.S. Pat. No. 5,359,521, issued to Kyrtsos et al, discloses analysis of pseudorange measurements at each of two or more adjacent GPS antennas, whose separation distances are precisely known, to obtain an optimized estimate of the location of one of the antennas.

Most of these approaches do not work exclusively with the pseudorange equations to determine the location coordinates of a mobile station, and some require use of geosynchronous satellites for whatever measurements are made and used. Further, these approaches do not allow straightforward location determination where the system is overdetermined (i.e., information from the satellite locations is more than is required for an exact location solution) or is undetermined, or where the receiver clock error changes substantially with time. A more useful approach would provide these advantages and would allow the user a choice of location determination using pseudorange information from two or more LD signal sources, whose accuracy, geometric location, availability and other attributes may vary from time to time.

SUMMARY OF THE INVENTION

These needs are met by the invention, which provides an approach for determination of the location coordinates and clock offset for a mobile station or other user, where the clock offset can be static or can vary with time. If M location fix coordinates (M=1, 2, 3, 4), including a static clock offset, are to be determined exactly, pseudorange measurements from M LD signal sources are required. If the clock offset is assumed to be dynamic and to vary according to a power law or some other reasonably well behaved analytic model, pseudorange measurements from at least M+1 or more LD sources are required to determine the location fix coordinates for the user. In the static(dynamic) clock offset situation, if pseudorange measurements from at least M+1 (M+2) sources are available, the location coordinates and clock offset are determinable exactly or within a computable range. LD signal sources may be synchronous or non-geosynchronous satellites, a mixture of these two, or ground-based sources. If only M−1 LD signals are available for determination of M location fix coordinates, the solution for two of these location fix coordinates is limited to an ellipse, an hyperbola or a point. If M+1 or more LD signal sources are available for determination of M location fix coordinates, the solution is limited to the interior or surface of a sphere in M-dimensional space.

DETAILED DESCRIPTION OF THE PREFERRED EMBODIMENTS

Figure 1:
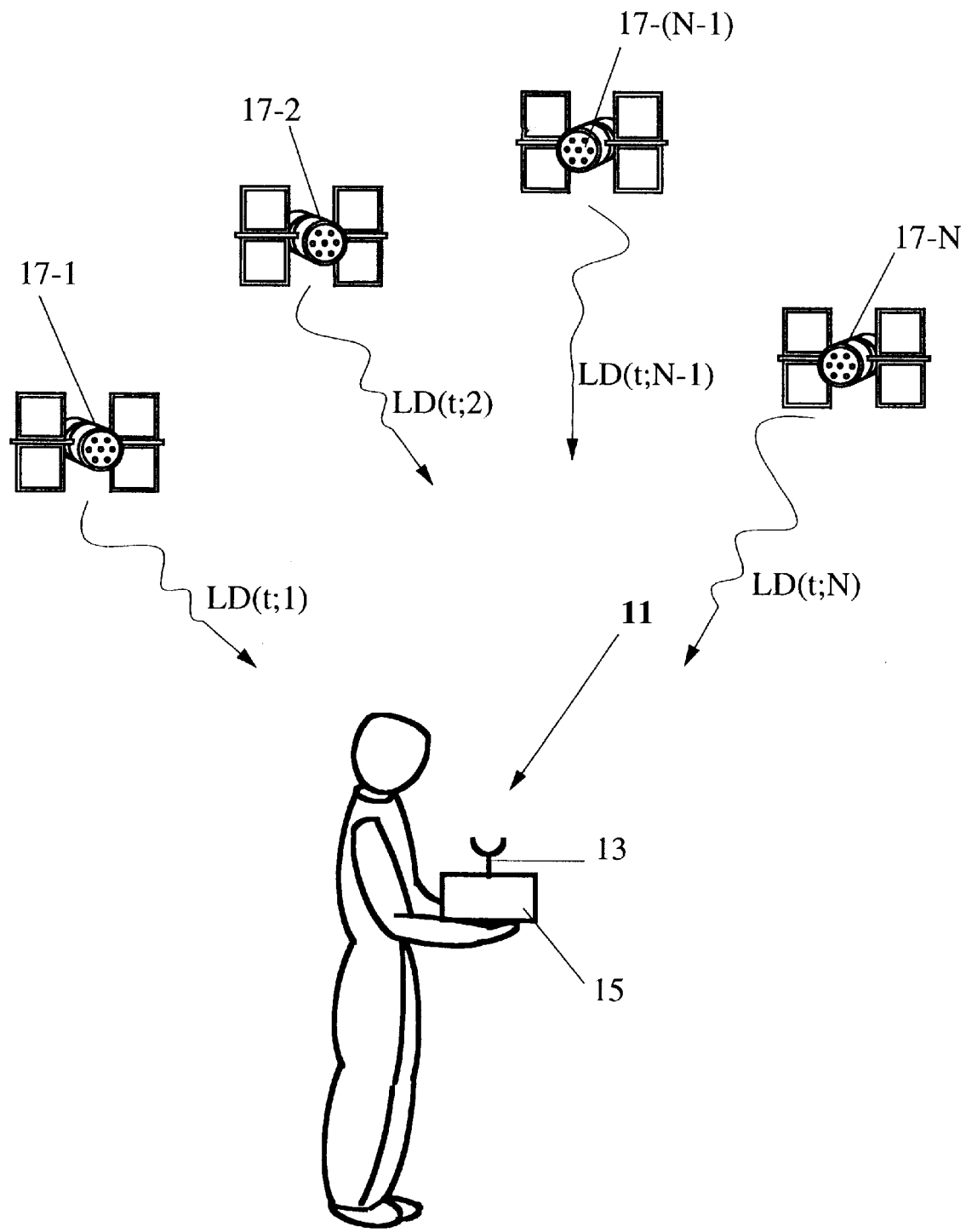
FIGS. 1 and 2 illustrate environments in which the invention is used.

In FIG. 1, a mobile LD station or other user 11 moves on or near the Earth's surface. The LD station 11 preferably includes an antenna 13 that receives Satellite Positioning System (SATPS) signals from each of a plurality of N SATPS satellites (N≧2) 17-1, 17-2, ..., 17-N, whose location coordinates $(x_n(t), y_n(t), z_n(t))$ (n=1, ..., N) vary in a known manner with time t. The satellites may be geosynchronous or non-geosynchronous. As used herein, an "SATPS satellite" is any satellite whose location coordinates are known with reasonable accuracy as a function of time, where the satellite transmits one or more streams of distinguishable, time-coded electromagnetic ("em") signals, preferably coded using FDMA and/or CDMA, that change with time in a known manner, that can be received by an electromagnetic signal receiver located on or near the Earth's surface and that can be distinguished from the signal stream(s) transmitted by another SATPS satellite. The SATPS signal sources 17-n (n=1, ..., N) may also be ground-based towers that transmit em signals, or a mixture of satellite-based and ground-based SATPS signal sources can be used.

Each SATPS signal is received by the SATPS antenna 13 and passed to an SATPS receiver/processor 15 that (1) distinguishes between the SATPS signals received from each SATPS satellite 17-n, (2) determines or measures the pseudorange, as defined in the following discussion, for satellite 17-n and (3) determines the present location of the LD station 11 from these measurements. The approach used here for determination of the present location coordinates (x,y,z) for the LD station 11 is exact non-iterative and allows determination of these coordinates in three, relatively straightforward steps (for N=4) that can each be interpreted geometrically. The result is a matrix equation relating the location coordinates and time offset linearly plus a quadratic equation involving only the time offset (or another location fix coordinate).

Figure 2:
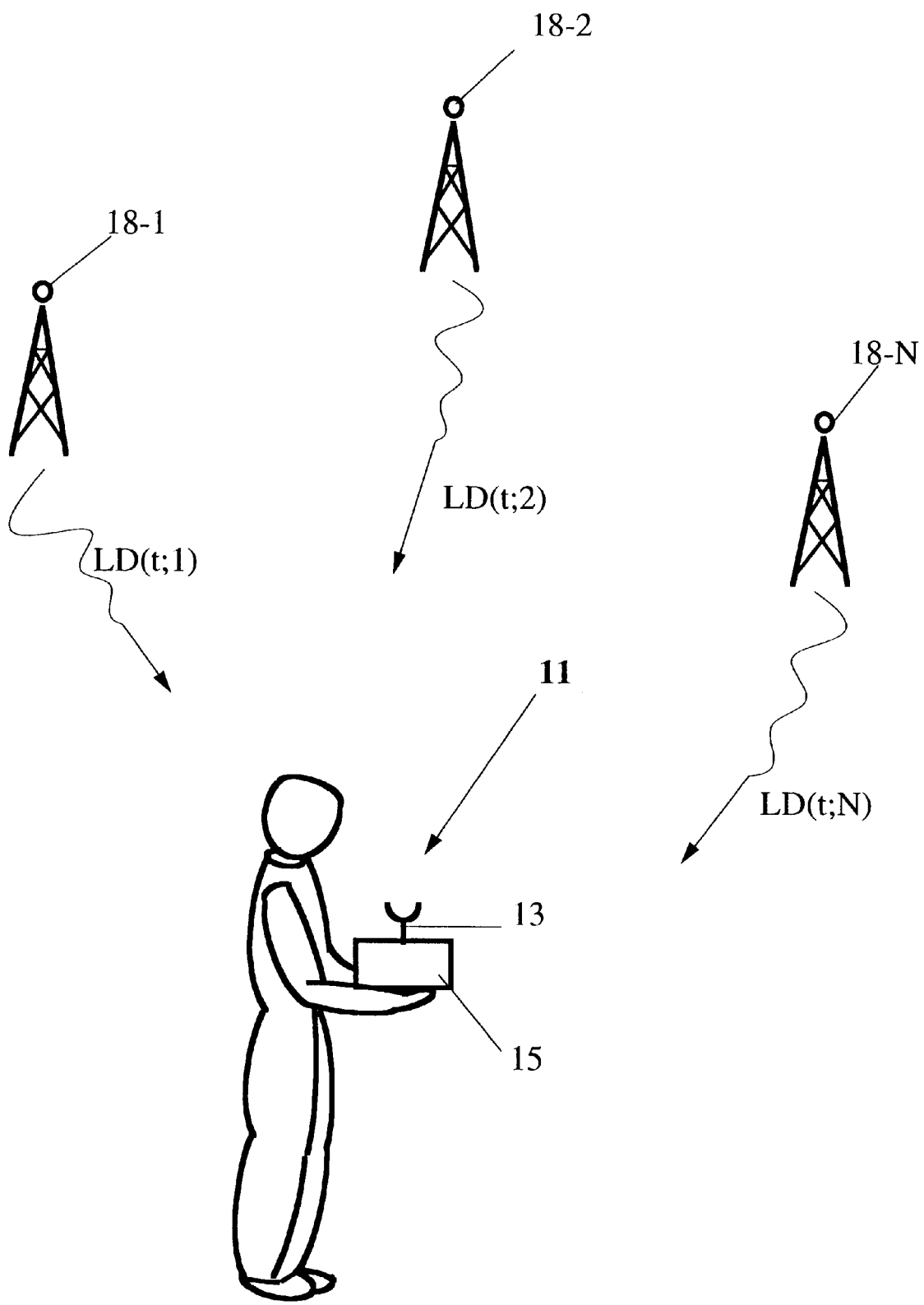

FIG. 2 illustrates an environment analogous to that shown in FIG. 1, except that the LD signal sources 18-1, 18-2, ..., 18-N are a plurality of N ground-based signal towers (n=1, ..., N) that transmit time-coded em signals. The following discussion is equally applicable to LD signals received in an SATPS and LD signals received in a ground-based LD system, such as Loran, Tacan, Decca, Omega, JTIDS Relnav, PLRS and VOR/DME.

Assume that LD signals are received and that pseudorange measurements are made from each of N satellites or ground-based radiowave sources at the LD station 11, whose location coordinates (x,y,z) are unknown, at a time coordinate value t that is also unknown as yet. Adopting the notation of Alfred Leick, *GPS Satellite Surveying*, John Wiley & Sons, NY, Second Edition, 1995, pages 248–253, the pseudorange value PR(t;n) for an LD signal received from LD signal source number n at the LD receiver 11 at (approximate) time $t=t_{r,n}$ is given by $$PR(t=t_{r,n};n)=c(t_{r,n}-\Delta t_{r,n})-c(t_{s,n}-\Delta t_{s,n})+I_{r,s,n}T_{r,s,n}R_{r,s,n}\approx[(x-x_n)^2+(y-y_n)^2+(z-z_n)^2]^{1/2}-c\Delta t_{r,n}, \quad (1)$$

where $(x_n,y_n,z_n)=(x_n(t_{s,n})y_n(t_{s,n})z_n(t_{s,n}))$ are the (approximately) known location coordinates for the nth LD signal source at the time $(t=t_{s,n})$ an LD signal is transmitted, $\Delta t_{s,n}$ is the nth LD source clock error (assumed to be known at the LD station 11), $\Delta t_{r,n}$ is the receiver clock error (assumed to be approximately constant initially), c is a representative velocity of light propagation, $I_{r,s,n}$ is the LD signal propagation time delay in the ionosphere, $T_{r,s,n}$ is the LD signal propagation time delay in the troposphere, and $R_{r,s,n}$ accounts for any residual time difference (multipath, etc.). The four primary unknowns in Eq. (1) are x, y, z and the LD station receiver "clock offset"

$$b=c\Delta t_{r,n}. \quad (2)$$

The nominal clock times $t=t_{r,n}$ of receipt of the LD signals from different LD signal sources need not be the same for each LD signal source 17-n (or 18-n) but are assumed to be close for all sources n, preferably within a few milliseconds. Equation (1) can be rewritten for each of the LD sources 17-n (or 18-n) as $$[(x-x_1)^2+(y-y_1)^2+(z-z_1)^2]^{1/2}=b-\chi(t_{r,1};t_{s,1};1), \quad (3\text{-}1)$$

. . .

$$[(x-x_n)^2+(y-y_n)^2+(z-z_n)^2]^{1/2}=b-\chi(t_{r,n};t_{s,n};n), \quad (3\text{-}n)$$

. . .

$$[(x-x_N)^2+(y-y_N)^2+(z-z_N)^2]^{1/2}=b-\chi(t_{r,N};t_{s,N};N), \quad (3\text{-}N)$$

$$\chi(t_{r,n};t_{s,n};n)=c(t_{s,n}-\Delta t_{s,n})+I_{r,s,n}+T_{r,s,n}-c\,t_{r,n}, \quad (4)$$

where $\chi(t_{r,n};t_{s,n};n))$ is assumed to be known. Equations (3-1) and (3-n) ($1 \le n \le N$) can be rewritten in the form $$[(x-x_{1,n}-\Delta x_{1,n})^2+(y-y_{1,n}-\Delta y_{1,n})^2+(z-z_{1,n}-\Delta z_{1,n})^2]^{1/2}=b-\chi(t_{r,1};t_{s,1};1),\ (n=2,\ldots,N) \quad (3\text{-}1')$$

$$[(x-x_{1,n}+\Delta x_{1,n})^2+(y-y_{1,n}+\Delta y_{1,n})^2+(z-z_{1,n}+\Delta z_{1,n})^2]^{1/2}=b-\chi(t_{r,n};t_{s,n};n), \quad (3\text{-}n')$$

$$x_{1,n}=(x_1+x_n)/2, \quad (5)$$

$$y_{1,n}=(y_1+y_n)/2, \quad (6)$$

$$z_{1,n}=(z_1+z_n)/2, \quad (7)$$

$$\Delta x_{1,n}=(x_1-x_n)/2, \quad (8)$$

$$\Delta y_{1,n}=(y_1-y_n)/2, \quad (9)$$

$$\Delta z_{1,n}=(z_1-z_n)/2, \quad (10)$$

Subtracting the square of Eq. (3-n') from the square of Eq. (3-1') yields the linear relation $$\Delta x_{1,n}(x-x_{1,n})+\Delta y_{1,n}(y-y_{1,n})+\Delta z_{1,n}(z-z_{1,n})==A_{1,n}-B_{1,n}b, \quad (11)$$

$$A_{1,n}=\chi(t_{r,1};t_{s,1};1)^2-\chi(t_{r,n};t_{s,n};n)^2, \quad (12)$$

$$B_{1,n}=2[\chi(t_{r,1};t_{s,1};1)-\chi(t_{r,n};t_{s,n};n)]. \quad (13)$$

More generally, one can subtract the square of Eq. (3-k) from the square of Eq. (3-m) to produce a linear relation in x, y, z and b, viz.

$$\Delta x_{m,k}(x-x_{m,k})+\Delta y_{m,k}(y-y_{m,k})+\Delta z_{m,k}(z-z_{m,k})==A_{m,k}-B_{m,k}b\,(m\neq k;\ m,k=1,\ldots N), \quad (14)$$

$$x_{m,k}=(x_m+x_k)/2, \quad (15)$$

$$\Delta x_{m,k}=(x_m-x_k)/2, \quad (16)$$

$$y_{m,k}=(y_m+y_k)/2, \quad (17)$$

$$\Delta y_{m,k}=(y_m-y_k)/2, \quad (18)$$

$$z_{m,k}=(z_m+z_k)/2, \quad (19)$$

$$\Delta z_{m,k}=(z_m-z_k)/2, \quad (20)$$

$$A_{m,k}=\chi(t_{r,m};t_{s,m};m)^2-\chi(t_{r,k};t_{s,k};k)^2, \quad (21)$$

$$B_{m,k}=2[\chi(t_{r,m};t_{s,m};m)-\chi(t_{r,k};t_{s,k};k)]. \quad (22)$$

Equation (11) provides N-1 linear relations between the location and clock offset variables $x-x_{1,n}$, $y-y_{1,n}$, $z-z_{1,n}$ and b in terms of the known or measurable time-dependent parameters $\Delta x_{1,n}$, $\Delta y_{1,n}$ and $\Delta z_{1,n}$ and the predictable or computable time-dependent parameters $A_{1,n}$ and $B_{1,n}$.

Assume that N=4 LD sources are visible initially from the mobile station 11 and that these four LD sources do not lie in a common plane. This can be implemented by choosing the four LD sources with the best Dilution of Precision (DOP) parameter, as discussed in Leick, op cit, pages 253–255. The three equations (11) for n=2, 3 and 4 can be restated in matrix form as $$\begin{bmatrix} \Delta x_{1,2} & \Delta y_{1,2} & \Delta z_{1,2} \\ \Delta x_{1,3} & \Delta y_{1,3} & \Delta z_{1,3} \\ \Delta x_{1,4} & \Delta y_{1,4} & \Delta z_{1,4} \end{bmatrix} \begin{bmatrix} x \\ y \\ z \end{bmatrix} = \begin{bmatrix} A'_{1,2}-B_{1,2}b \\ A'_{1,3}-B_{1,3}b \\ A'_{1,4}-B_{1,4}b \end{bmatrix}, \quad (23)$$

$$A'_{1,m}=A_{1,m}+(\Delta x_{1,m})(x_{1,m})+(\Delta y_{1,m})(y_{1,m})+(\Delta z_{1,m})(z_{1,m}) \quad (24)$$

$$(m=2,3,4)$$

The 3×3 matrix and the 3×1 matrix on the left hand side of Eq. (23) are written as H and $$R = \begin{bmatrix} x \\ y \\ z \end{bmatrix}, \quad (25)$$

respectively, and the 3×1 matrix on the right hand side of Eq. (23-1) is written as $$A'-Bb = \begin{bmatrix} A'_{1,2}-B_{1,2}b \\ A'_{1,3}-B_{1,3}b \\ A'_{1,4}-B_{1,4}b \end{bmatrix}. \quad (26)$$

If the four LD signal sources do not lie on a common plane, the matrix H is invertible, and Eq. (23) can be inverted to yield $$R=H'(A'-B\,b), \quad (27)$$

$$H'=H^{-1}, \quad (28)$$

so that x, y and z are known linear functions of the fourth variable b.

The fourth defining equation is obtained by squaring Eq. (3-1'), which yields a quadratic equation in the unknown clock offset b, namely $$[H'_{11}A'_{1,2}+H'_{12}A'_{1,3}+H'_{13}A'_{1,4}-x_{1,2}-\Delta x_{1,2}-(H'_{11}B_{1,2}+H'_{12}B_{1,3}+H'_{13}B_{1,4})b]^2 + \quad (29)$$
$$[H'_{21}A'_{1,2}+H'_{22}A'_{1,3}+H'_{23}A'_{1,4}-y_{1,2}-\Delta y_{1,2}-(H'_{21}B_{1,2}+H'_{22}B_{1,3}+H'_{23}B_{1,4})b]^2 +$$
$$[H'_{31}A'_{1,2}+H'_{32}A'_{1,3}+H'_{33}A'_{1,4}-z_{1,2}-\Delta z_{1,2}-(H'_{31}B_{1,2}+H'_{32}B_{1,3}+H'_{33}B_{1,4})b]^2 = [b-\chi(t_{r,1};t_{s,1};1)]^2,$$

where $H'_{ij}$ is the entry in the matrix $H'=H^{-1}$ in the ith row and jth column. Equation (29) may be rewritten as $$E\,b^2+2F\,b+G=0, \quad (30)$$

$$E = \sum_{i=1}^{3}\left[\sum_{j=1}^{3} H'_{ij} B_{1,j+1}\right]^2 - 1, \tag{31}$$

$$F = -\sum_{i=1}^{3}\left[\sum_{j=1}^{3} H'_{ij} B_{1,j+1}\right]\left[\sum_{k=1}^{3} H'_{ik} A'_{1,k+1} - C_{i+1}\right] + \chi(t_{r,1}; t_{s,1}; 1), \tag{32}$$

$$G = \sum_{i=1}^{3}\left[\sum_{j=1}^{3} H'_{ij} A'_{1,j+1} - C_{i+1}\right]^2 - \chi(t_{r,1}; t_{s,1}; 1)^2, \tag{33}$$

$$C_2 = x_{12} + \Delta x_{12}, \tag{34}$$

$$C_3 = y_{12} + \Delta y_{12}, \tag{35}$$

$$C_4 = z_{12} + \Delta z_{12}, \tag{36}$$

$$b = \{-F \pm [F^2 - E\, G]^{1/2}\}/E. \tag{37}$$

This last quadratic equation in b has two solutions, one of which is consistent with the physical or geometrical constraints on b ($|b|$ is relatively small). The total solution set includes the N−1=3 linear equations set forth in Eq. (27) plus Eq. (37), which involves computation of a single square root of a known number. This is an improvement on the original set of defining relations, Eqs. (1) for n=1, 2, 3, 4, each of which requires computation of a square root and iterated computations to determine the solution coordinate set.

Equation (29) uses only Eq. (3-1) to obtain a quadratic equation in the clock offset variable b, and Eq. (3-1) is used to obtain each of the linear relations (11). Another approach, which treats all of the relations (3-n) more symmetrically, squares Eq. (3-k) and subtracts this from the square of Eq. (3-m) (m≠k; m, k=1, 2, . . . , N) to produce the general linear relation $$\Delta x_{m,k}(x - x_{m,k}) + \Delta y_{m,k}(y - y_{m,k}) + \Delta z_{m,k}(z - z_{m,k}) = A_{m,k} - B_{m,k} b, \tag{38}$$

$$A_{m,k} = \chi(t_{r,n}; t_{s,n}; n)^2 - \chi(t_{r,k}; t_{s,k}; k)^2, \tag{39}$$

$$B_{m,k} = 2[\chi(t_{r,m}; t_{s,m}; m) - \chi(t_{r,k}; t_{s,k}; k)]. \tag{40}$$

The analog of Eq. (23) is then expressed more symmetrically as $$\begin{bmatrix} \Delta X_{1,2;3,4} & \Delta Y_{1,2;3,4} & \Delta Z_{1,2;3,4} \\ \Delta X_{2,3;4,1} & \Delta Y_{2,3;4,1} & \Delta Z_{2,3;4,1} \\ \Delta X_{1,3;2,4} & \Delta Y_{1,3;2,4} & \Delta Z_{1,3;2,4} \end{bmatrix} \begin{bmatrix} x \\ y \\ z \end{bmatrix} = \begin{bmatrix} A_{1,2;3,4} - B_{1,2;3,4} b \\ A_{2,3;4,1} - B_{2,3;4,1} b \\ A_{1,3;2,4} - B_{1,3;2,4} b \end{bmatrix}, \tag{41}$$

$$\Delta X_{i,j;k,1} = \Delta x_{i,j} - \Delta x_{k,1}, \tag{42}$$

$$\Delta Y_{i,j;k,1} = \Delta y_{i,j} - \Delta y_{k,1}, \tag{43}$$

$$\Delta Z_{i,j;k,1} = \Delta z_{i,j} - \Delta z_{k,1}, \tag{44}$$

$$A_{i,j;k,1} = A_{i,j} - A_{k,1} + (\Delta x_{i,j})(x_{i,j}) + (\Delta y_{i,j})(y_{i,j}) + (\Delta z_{i,j})(z_{i,j}) - (\Delta x_{k,1})(x_{k,1}) - (\Delta y_{k,1})(y_{k,1}) - (\Delta z_{k,1})(z_{k,1}), \tag{45}$$

$$B_{i,j;k,1} = B_{i,j} - B_{k,1}. \tag{46}$$

The inverse of the 3×3 matrix on the left in Eq. (41) can be shown to exist and is denoted H″, and the 3×1 matrix on the right in Eq. (41) is denoted A″−B″ b, where A″ and B″ are independent of the clock offset value b. Equation (41) is then inverted to produce the more symmetrical solutions $$R = \begin{bmatrix} x \\ y \\ z \end{bmatrix} = H''(A'' - B'' b). \tag{47}$$

The inverses of the 3×3 matrices on the left side in Eqs. (23) and (42) are easily determined using the algebraic rules for inverses. For example, $$(H')_{ij} = (-1)^{i+j} cof(H_{ij})/det(H) \quad (i,j=1, 2, 3), \tag{48}$$

where $cof(H_{ji})$ is the cofactor of the element $H_{ji}$ in the determinant of H.

A symmetric version of Eq. (29) or (30) is obtained by squaring each of Eqs. (3-n) (n=1, . . . , N) and adding these relations to produce a new quadratic equation in b, which is written as $$E' b^2 + 2F' b + G' = 0, \tag{49}$$

$$E' = N^2 - N \sum_{k=1}^{3} ((HB)_k)^2, \tag{50}$$

$$F' = -2 \sum_{m=1}^{4} \chi_m + 2N \sum_{k=1}^{3} (HB)_k (HA)_k - 2\left(\sum_{m=1}^{3} x_m\right)(HB_1) - 2\left(\sum_{m=1}^{3} y_m\right)(HB)_2 - 2\left(\sum_{m=1}^{3} z_m\right)(HB)_3, \tag{51}$$

$$G' = \sum_{m=1}^{4} \chi_m^2 - N \sum_{k=1}^{3} ((HA)_k)^2 + 2\left(\sum_{m=1}^{4} x_m\right)(HA)_1 + 2\left(\sum_{m=1}^{4} y_m\right)(HA)_2 + 2\left(\sum_{m=1}^{4} z_m\right)(HA)_3, \tag{52}$$

$$(HA)_k = H''_{k1} A''_{1,2;3,4} + H''_{k2} A''_{2,3;4,1} + H''_{k3} A''_{1,3;2,4}, \quad (k=1, 2, 3), \tag{53}$$

$$(HB)_k = H''_{k1} B''_{1,2;3,4} + H''_{k2} B''_{2,3;4,1} + H''_{k3} B''_{1,3;2,4}, \quad (k=1, 2, 3), \tag{54}$$

$$\chi_m = \chi(t_{r,m}; t_{s,m}; m) - \chi(t_{r,k}; t_{s,k}; k), \tag{55}$$

where $H''_{ij}$ is the entry in the ith row and jth column of the matrix H″ and all other quantities are defined above. Equation (48) has two (real) solutions, $$b = \{-F' \pm [F'^2 - E' G']^{1/2}\}/E'. \tag{56}$$

one of which is consistent with the practical constraints ($|b|$ is relatively small). Once the clock offset value b is determined, the location coordinates are found from Eq. (47).

Now consider the case where N≧5 LD signal sources are available. Equation (23) (or Eq. (41)) is written as $$H R = A' - B\, b, \tag{57}$$

where H is an (N−1)×3 matrix (non-square), R and A' and B are (N−1)×1 column matrices, and N−1≧4. One can form the 3×(N−1) Hermitean adjoint, denoted H$^+$, of the matrix H and apply the matrix (H$^+$H)$^{-1}$ H$^+$ to Eq. (57) to produce the relation $$(H^+H)^{-1}H^+H\ R = R = (H^+H)^{-1}\ H^+(A'-B\ b). \quad (58)$$

However, Eq. (58) represents an overdetermined group of equations, and any formal solution of Eq. (58) is likely to be restricted to a subspace solution, which satisfies less than all of the N relations in Eq. (57).

Because Eq. (57) represents an over-determined set of equations, one can seek an approximate 4×1 solution vector S' given by S'$^{tr}$=(x', y', z', b') that is "as close as possible" to the true solution vector S$^{tr}$=(x, y, z, b) in some least mean square sense, by choosing solution vector components x', y', z' and b' that minimize an error parameter. For example, if Eq. (23) is utilized, the error sum might be $$\varepsilon = w_1[H_{11}x' + H_{12}y' + H_{13}z' - A'_{12} - B_{12}b]^2 + \quad (59)$$
$$w_2[H_{21}x' + H_{22}y' + H_{23}z' - A'_{13} - B_{13}b]^2 +$$
$$w_3[H_{31}x' + H_{32}y' + H_{33}z' - A'_{14} - B_{14}b]^2 + \ldots +$$
$$w_{N-1}[H_{N-1,1}x' + H_{N-1,2}y' + H_{N-1,3}z' - A'_{1,N} - B_{1,N}b]^2 -$$
$$w_N[b - \chi(t_{r,1}; t_{s,1}; 1)]^2,$$

where $w_1, w_2, w_3, \ldots, w_N$ are selected non-negative weight coefficients and the coefficients A'$_{1i}$ and B$_{1i}$ (i=2, 3, . . . , N) are the row components of the A' and B matrices in Eq. (57). One can, of course, use uniform weight coefficients ($w_1 = w_2 = \ldots w_N$). Another suitable weight coefficient scheme allows the weight coefficients to depend on the PDOP, HDOP and/or VDOP parameters associated with different four-satellite constellations from among the N satellites (N≧5).

The situation where N≧5 LD signal sources are available can also be analyzed as $\binom{N}{4}$=N!/(4!)(N−4)! separate subsystems of 4 distinct LD signal sources drawn from a group of N such sources, and a region of uncertainty for the present location of the LD signal antenna 13 can be estimated. Assume that no four of the LD antenna locations $L_k$ are coplanar. The situation N=5 is first examined for purposes of illustration. Five subsystems, numbered k=1, 2, 3, 4, 5, each including four of the LD signal sources, with LD signal source no. k being deleted in subsystem no. k, are analyzed according to the preceding discussion for N=4. An embodiment of the invention provides explicit location coordinates, written ($x_{a,k}$, $y_{a,k}$, $z_{a,k}$) or $L_k$, for the LD signal antenna location for subsystem no. k.

Given any four of these five locations $L_k$, such as $L_1$, $L_2$, $L_3$ and $L_4$ (subsystem 5), a unique sphere $S_{1,2,3,4}$ can be found that passes through these four locations, and the location coordinates ($x_0$, $y_0$, $z_0$)$_{1,2,3,4}$ of the center of this sphere are easily found. The sphere center satisfies the relations $$(x_{a,k}-x_0)^2+(y_{a,k}-y_0)^2+(z_{a,k}-z_0)^2=r^2 \ (k=1,2,3,4), \quad (60)$$

where r=r(1,2,3,4) is the as-yet-undetermined radius of the sphere $S_{1,2,3,4}$. Subtracting Eq.(60) for each of k=2, 3 and 4 from Eq. (60) for k=1, the resulting three equations can be rearranged in matrix form as $$\begin{bmatrix} x_{a,1}-x_{a,2} & y_{a,1}-y_{a,2} & z_{a,1}-z_{a,2} \\ x_{a,1}-x_{a,3} & y_{a,1}-y_{a,3} & z_{a,1}-z_{a,3} \\ x_{a,1}-x_{a,4} & y_{a,1}-y_{a,4} & z_{a,1}-z_{a,4} \end{bmatrix} \begin{bmatrix} x_0 \\ y_0 \\ z_0 \end{bmatrix} - \begin{bmatrix} (r_1^2-r_2^2)/2 \\ (r_1^2-r_3^2)/2 \\ (r_1^2-r_4^2)/2 \end{bmatrix}, \quad (61)$$

$$r_k^2 = x_{a,k}^2 + y_{a,k}^2 + z_{a,k}^2 \ (k=1, 2, 3, 4). \quad (62)$$

Equation (61) can be written in matrix form as $$M(1,2,3,4)\ X_0(1,2,3,4) = D(1,2,3,4), \quad (63)$$

where M is the 3×3 matrix on the left, $X_0 = [x_0\ y_0\ z_0]^{tr}$ is the 3×1 column matrix on the left and D is the 3×1 column matrix on the right in Eq. (61) for the four locations $L_1$, $L_2$, $L_3$ and $L_4$. The matrix M has a nonzero determinant, and is thus invertible, because the four locations $L_k$(k=1, 2, 3, 4) are not coplanar. The location coordinates for the sphere center are then expressed in the form $$X_0(1,2,3,4) = \begin{bmatrix} x_0 \\ y_0 \\ z_0 \end{bmatrix} = M(1,2,3,4)^{-1}D(1,2,3,4). \quad (64)$$

Figure 4:
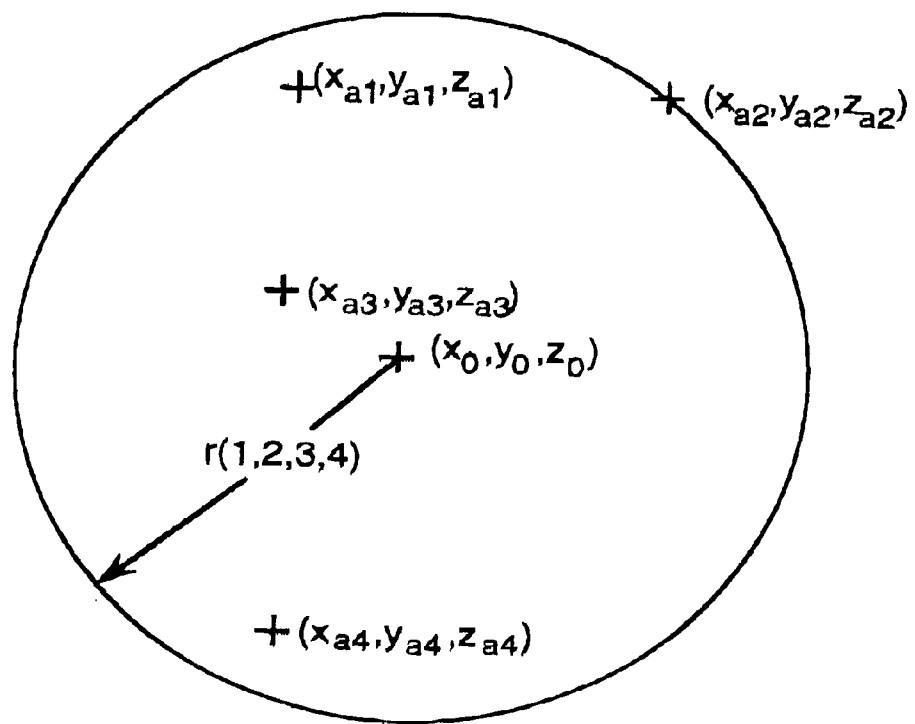
FIG. 4 illustrates a spherical solution where an excess of LD signals is received and processed according to the invention.

The sphere radius squared, r(1,2,3,4)$^2$, is then obtained from Eq. (60) for any of the equations with k=1, 2, 3 or 4. FIG. 4 illustrates a spherical solution obtained according to the preceding analysis.

The determinant of the matrix M(1,2,3,4), or, equivalently, the determinant of the 3×3 matrix on the left in Eq. (23), is proportional to the PDOP parameter, which sometimes defined as is the ratio of the tetrahedral volume defined by the four points with coordinates ($x_m, y_m, z_m$) (m=1, 2, 3, 4) divided by the maximum tetrahedral for four points lying on a sphere, centered at the Earth's center and having a radius equal to the SATPS satellite orbits common radius from the Earth's center. The magnitude of the determinant of M(1,2,3,4) is the numerator volume for the PDOP parameter.

One now computes the square of the distance of the location $L_5$ from the sphere center, viz.

$$r_{0,5}^2 = (x_{a,5}-x_0)^2 + (y_{a,5}-y_0)^2 + (z_{z,5}-z_0)^2, \quad (65)$$

and inquires whether $$r_{0,5}^2 \leq r(1,2,3,4)^2, \quad (66)$$

is satisfied. If the answer to this inquiry is "yes," the location $L_5$ lies on the surface of or within the sphere $S_{1,2,3,4}$, and the pair $$P_{1,2,3,4} = (X_0(1,2,3,4),\ r(1,2,3,4)) \quad (67)$$

is added to a set Π. If the inequality in Eq. (66) is not satisfied, the pair ($X_0(1,2,3,4),\ r(1,2,3,4)$) is discarded.

The computations in the preceding paragraph are repeated for each of the other sets of four locations, namely {$L_1, L_2, L_3, L_5$}, {$L_1, L_2, L_4, L_5$}, {$L_1, L_3, L_4, L_5$}, and {$L_2, L_3, L_4, L_5$}, and the corresponding radius r and location coordinates (x0, y0, z0) for each of the respective spheres $S_{1,2,3,5}$, $S_{1,2,4,5}$, $S_{1,3,4,5}$, and $S_{2,3,4,5}$ are determined as in the preceding paragraph. Again one inquires if any of the inequalities $$r_{0,4}^2 = (x_{a,4}-x_0)^2 + (y_{1,4}-y_0)^2 + (z_{a,4}-z_0)^2 \leq r(1,2,3,5)^2, \quad (66')$$

$$r_{0,3}{}^2 = (x_{a,3}-x_0)^2 + (y_{1,3}-y_0)^2 + (z_{a,4}-z_0)^2 \leq r(1,2,4,5)^2, \quad (66'')$$

$$r_{0,2}{}^2 = (x_{a,2}-x_0)^2 + (y_{1,2}-y_0)^2 + (z_{a,4}-z_0)^2 \leq r(1,3,4,5)^2, \quad (66''')$$

$$r_{0,1}{}^2 = (x_{a,1}-x_0)^2 + (y_{1,1}-y_0)^2 + (z_{a,4}-z_0)^2 \leq r(2,3,4,5)^2, \quad (66'''')$$

is satisfied? If one of the preceding inequalities is satisfied, the corresponding pair $$P_{1,2,3,5} = (X_0(1,2,3,5), r(1,2,3,5)), \quad (67')$$

$$P_{1,2,4,5} = (X_0(1,2,4,5), r(1,2,4,5)), \quad (67'')$$

$$P_{1,3,4,5} = (X_0(1,3,4,5), r(1,3,4,5)), \quad (67''')$$

$$P_{2,3,4,5} = (X_0(2,3,4,5), r(2,3,4,5)), \quad (67'''')$$

is placed in the set Π. Otherwise, the corresponding pair is discarded. After all five sets of four locations $\{L_1, L_2, L_3, L_5\}$, $\{L_1, L_2, L_3, L_5\}$, $\{L_1, L_2, L_4, L_5\}$, $\{L_1, L_3, L_4, L_5\}$, and $\{L_2, L_3, L_4, L_5\}$, have been analyzed in this manner, the set Π contains at least one pair. Define $$r_{min} = r(a,b,c,d) = \min_{(X_0(h,i,j,k), r(h,i,j,k)) \in \Pi} \{r(h,i,j,k)\}. \quad (68)$$

The region of uncertainty of the location of the LD signal antenna 13 is then the sphere $S_{a,b,c,d}$, centered at $X_0(a,b,c,d)$, with radius $r(a,b,c,d)$, and $X_0(a,b,c,d)$ can be designated as the location of the LD signal antenna 13 in this embodiment. The sphere $S_{a,b,c,d}$ and its radius $r_{min} = r(a,b,c,d)$ can also be determined by seeking the smallest sphere radius for which that sphere contains all the locations $L_1$, $L_2$, $L_3$, $L_4$ and $L_5$. This analysis is easily extended to N LD signal sources with $N \geq 5$, where the number of sets of locations $L_k$ taken four at a time is $\binom{N}{4} = N!/(4!)(N-4)!$.

In another approach for the situation N=5, the spatial location coordinates for the user are taken to be $(x_0, y_0, z_0)$, with an associated distance uncertainty of $r_{min}$, where the coordinates $(x_0, y_0, z_0)$ are determined in Eq. (64) and the uncertainty radius $r_{min}$ is determined in Eq. (68).

In another approach for the situation N=5, a group of four location fix coordinates (x,y,z,s) (s=c·b, with c being the velocity of light propagation in the ambient medium) is interpreted as coordinates in a four-dimensional Cartesian space. Each location fix coordinate set $(x_{a,k}, y_{a,k}, z_{a,k}, s_{a,k})$ (k=1, 2, 3, 4, 5) is now interpretable as a "point" in 4-space, and it is assumed that these five points do not lie in a co-hyperplane; that is, no non-zero set of five numbers $F_k$(k=1, 2, 3, 4, 5) can be found for which the relations $$\sum_{k=1}^{5} F_k x_{a,k} = \sum_{k=1}^{5} F_k y_{a,k} = \sum_{k=1}^{5} F_k z_{a,k} = \sum_{k=1}^{5} F_k s_{a,k} = 0. \quad (69)$$

are simultaneously satisfied.

For any set of five four-dimensional coordinates in 4-space that are not co-hyperplanar, a sphere $S_{1,2,3,4,5}$ can be found that includes the "points" corresponding to these location sets on the sphere surface. If the center of the sphere $S_{1,2,3,4,5}$ has coordinates $(x_0, y_0, z_0, s_0)$ and a radius $r(1,2,3,4,5)$ in 4-space (not yet known), the location fix coordinates $(x_{a,k}, y_{a,k}, z_{a,k}, s_{a,k})$ satisfy the constraints $$(x_{a,k}-x_0)^2 + (y_{a,k}-y_0)^2 + (z_{a,k}-z_0)^2 + (s_{a,k}-s_0)^2 = r(1,2,3,4,5)^2 \quad (k=1,2,3,4,5). \quad (70)$$

Proceeding by analogy with the development of Eqs. (61)–(63), by subtracting Eq. (70) for k=2, 3, 4 and 5 from Eq. (70) for k=1, one obtains the following relations $$\begin{bmatrix} x_{a,1}-x_{a,2} & y_{a,1}-y_{a,2} & z_{a,1}-z_{a,2} & s_{a,1}-s_{a,2} \\ x_{a,1}-x_{a,3} & y_{a,1}-y_{a,3} & z_{a,1}-z_{a,3} & s_{a,1}-s_{a,3} \\ x_{a,1}-x_{a,4} & y_{a,1}-y_{a,4} & z_{a,1}-z_{a,4} & s_{a,1}-s_{a,4} \\ x_{a,1}-x_{a,5} & y_{a,1}-y_{a,5} & z_{a,1}-z_{a,5} & s_{a,1}-s_{a,5} \end{bmatrix} \begin{bmatrix} x_0 \\ y_0 \\ z_0 \\ s_0 \end{bmatrix} = \begin{bmatrix} (r_1^2-r_2^2)/2 \\ (r_1^2-r_3^2)/2 \\ (r_1^2-r_4^2)/2 \\ (r_1^2-r_5^2)/2 \end{bmatrix} \quad (71)$$

where $$r_k^2 = x_{a,k}^2 + y_{a,k}^2 + z_{a,k}^2 + s_{a,k}^2 \quad (k=1, 2, 3, 4, 5). \quad (72)$$

Equation (71) can be written in matrix form as $$M(1,2,3,4,5) \, X_0(1,2,3,4,5) = D(1,2,3,4,5), \quad (73)$$

where M(1,2,3,4,5) is the 4×4 matrix on the left, $X_0(1,2,3,4,5) = [x_0 \, y_0 \, z_0 \, s_0]^{Tr}$ is the 4×1 column matrix on the left and D(1,2,3,4,5) is the 4×1 column matrix on the right in Eq. (71) for the five locations $L_1$, $L_2$, $L_3$, $L_4$ and $L_5$. The matrix M has a nonzero determinant, and is thus invertible, because the four locations $L_k$(k=1, 2, 3, 4) are not co-hyperplanar. The location coordinates for the sphere center are then expressed in the form $$X_0(1, 2, 3, 4, 5) = \begin{bmatrix} x_0 \\ y_0 \\ z_0 \\ s_0 \end{bmatrix} = M(1, 2, 3, 4, 5)^{-1} D(1, 2, 3, 4, 5). \quad (74)$$

The sphere radius squared, $r(1,2,3,4,5)^2$, is then obtained from Eq. (70) for any of the equations with k=1, 2, 3, 4 or 5.

Where acceptable signals from N=5 satellites are received and the pseudoranges are measured, the location coordinates $(x_0, y_0, z_0, s_0)$ can be used for the location fix coordinates (x, y, z, s=c·b) for the user location, with an associated uncertainty in 4-space equal to r(1,2,3,4,5).

For a situation with $N \geq 6$ satellites, the preceding analysis for $N \geq 5$ satellites, working in 3-space with only the location coordinates (x,y,z), can be extended. For N=6 satellites, one begins with the solution $X_0(a,b,c,d,e)$ for the center of a sphere S(a,b,c,d,e) that contains the five coordinate fix sets $(x_{a,k}, y_{a,k}, z_{a,k}, s_{a,k})$ (k=a, b, c, d, e) on its surface. Here, a, b, c, d, e and f represent the six numerals 1, 2, 3, 4, 5 and 6, in any order. The sphere radius r(a,b,c,d,e) is then determined. One next determines whether the remaining coordinate fix set $(x_{a,k}, y_{a,k}, z_{a,k}, s_{a,k})$ with k=f lies within or on the surface of the sphere S(a,b,c,d,e) or lies outside this sphere.

By allowing f to assume the integer values f=1, 2, 3, 4, 5 and 6, one obtains six spheres S(a,b,c,d,e) and six associated radii r(a,b,c,d,e). At least one of the six spheres contains a corresponding location fix coordinate set $(x_{a,f}, y_{a,f}, z_{a,f}, s_{a,f})$. Let Π be the set of coordinate fix sets $(x_{a,k}, y_{a,k}, z_{a,k}, s_{a,k})$ (k=a, b, c, d, e; k≠f) for which the sphere S(a,b,c,d,e) contains the coordinate fix set $(x_{a,f}, y_{a,f}, z_{a,f}, s_{a,f})$. For N ($\geq 6$) visible satellites present, the set Π has at least one member and has at most ( ) members. Let $$r0 = \min_{(x_{a,k}, y_{a,k}, z_{a,k}, s_{a,k}) \in \Pi} \{r(a,b,c,d,e)\} = r(a\hat{}, b\hat{}, c\hat{}, d\hat{}, e\hat{})$$

be the minimum radius of all spheres S(a,b,c,d,e) for which $(x_{a,k}, y_{a,k}, z_{a,k}, s_{a,k})$ belongs to Π. The sphere center $X_0(a\hat{}, b\hat{}, c\hat{}, d\hat{}, e\hat{})$ has four coordinates, which are taken to be the location fix coordinates of the user, with an associated uncertainty of $r(a\hat{},b\hat{},c\hat{},d\hat{},e\hat{})$. These considerations extend easily to N>6 visible satellites and provide a method for determining the user location fix coordinates when more than five satellites provide acceptable signals.

If $N \leq 3$ LD signal sources are available, Eq. (57) represents a group of under-determined equations. One could form the error parameter $\epsilon$ as in Eq. (59) and choose the components x', y', z' and b' to minimize $\epsilon$ again, with $N \leq 3$. This would produce a solution set that is confined to a (4−N)-dimensional subspace, such as a line or a plane, of the 4-dimensional solution space. One or more additional relations or constraints can be added to reduce the solution set to a point in the 4-dimensional solution subspace, as desired.

In one approach for $N \leq 3$, measurements from one or more additional instruments, such as altimeters or inertial sensing instruments, can be used to supplement Eqs. (57) and (58). These additional readings are included to provide a solution set of four coordinates (x,y,z,b) or one or more relations between the solution set coordinates.

In another approach for $N \leq 3$, one could confine the location of the LD station antenna 13 to a known surface (useful for N=3) or to a known space curve, such as a railroad track (useful for N=2). Alternatively, one could assume that a highly accurate clock provides the time at the LD signal receiver/processor (useful for N=3).

The situation with N=3 visible satellites, numbered n=1, 2 and 3, may be analyzed in the following manner. It is assumed that the satellite coordinates $(x_1,y_1,z_1)$, $(x_2,y_2,z_2)$ and $(x_3,y_3,z_3)$ are non-collinear. Equations (11) are restated as $$\Delta x_{1,2} \cdot x + \Delta y_{1,2} \cdot y + \Delta z_{1,2} \cdot z + B_{1,2} \cdot b = A'_{1,2} = A_{1,2} + \Delta x_{1,2} \cdot x_{1,2} + \Delta y_{1,2} \cdot y_{1,2} \Delta z_{1,2} \cdot z_{1,2}, \quad (75\text{-}1)$$

$$\Delta x_{1,3} \cdot x + \Delta y_{1,3} \cdot y + \Delta z_{1,3} \cdot z + B_{1,3} \cdot b = A'_{1,3} = A_{1,3} + x_{1,3} \cdot x_{1,3} + \Delta y_{1,3} \cdot y_{1,3} \Delta z_{1,3} \cdot z_{1,3}, \quad (75\text{-}2)$$

where $A_{1,2}$, $B_{1,2}$, $A_{1,3}$ and $B_{1,3}$ are defined in Eqs. (12) and (13). Equations (75-1) and (75-2) are easily inverted to express x and y as linear functions of z and b, viz.

$$\begin{bmatrix} x \\ y \end{bmatrix} = \begin{bmatrix} G11 & G12 \\ G21 & G22 \end{bmatrix} \begin{bmatrix} z \\ b \end{bmatrix} + \begin{bmatrix} G10 \\ G20 \end{bmatrix} \quad (76)$$

$$G11 = \{-\Delta y_{1,3} \cdot \Delta z_{1,2} + \Delta y_{1,2} \cdot \Delta z_{1,3}\}/Det(1,2,3), \quad (77)$$

$$G12 = \{-\Delta y_{1,3} \cdot B_{1,2} + \Delta y_{1,2} \cdot B_{1,3}\}/Det(1,2,3), \quad (78)$$

$$G21 = \{\Delta x_{1,3} \cdot \Delta z_{1,2} - x_{1,2} \cdot \Delta z_{1,3}\}/Det(1,2,3), \quad (79)$$

$$G22 = \{\Delta x_{1,3} \cdot B_{1,2} - \Delta x_{1,2} \cdot B_{1,3}\}/Det(1,2,3), \quad (80)$$

$$G10 = \{\Delta y1,3 \cdot A'1,2 - \Delta y1,2 \cdot A'1,3\}/Det(1,2,3), \quad (81)$$

$$G20 = \{-\Delta x1,3 \cdot A'1,2 + \Delta x1,2 \cdot A \cdot 1,3\}/Det(1,2,3), \quad (82)$$

$$Det(1,2,3) = \Delta x_{1,2} \cdot \Delta y_{1,3} - \Delta x_{1,3} \cdot \Delta y_{1,2}. \quad (83)$$

The quantity Det1,2,3) is non-zero because the coordinates $(x_1,y_1,z_1)$, $(x_2,y_2,z_2)$ and $(x_3,y_3,z_3)$ are non-collinear. Both sides of Eq. (3-1) are squared, and Eqs. (76) are utilized to produce the relation $$(G11 \cdot (z-z_1) + G12 \cdot (b-\chi_1) + G10 + G11 \cdot z_1 + G12 \cdot \chi_1 - x_1)^2 + \quad (84)$$
$$(G21 \cdot (z-z_1) + G22 \cdot (b-\chi_1) + G20 + G21 \cdot z_1 + G22 \cdot \chi_1 - y_1)^2$$
$$+ (z-z_1)^2 - (b-\chi_1)^2 = 0.$$

Equations (76) and (84) provide three equations in the four unknown location fix coordinates (x,y,z,b). If any one of these four coordinates is known, the other three can be determined using these three equations.

More generally, all four location fix coordinates are unknown. In this situation, like terms are collected and Eq. (84) is restated in the form $$(G11^2 + G21^2 + 1) \cdot (z-z_1)^2 + (G12^2 + G22^2 - 1) \cdot (b-\chi_1)^2 + \quad (85)$$
$$2(G11 \cdot G12 + G21 \cdot G22) \cdot (z-z_1) \cdot (b-\chi_1) +$$
$$2\{G11 \cdot (G11 \cdot z_1 + G12 \cdot \chi_1 + G20 - x_1) +$$
$$G21 \cdot (G21 \cdot z_1 + G22 \cdot \chi_1 + G20 - y_1)\} \cdot (z-z_1) +$$
$$2\{G12 \cdot (G11 \cdot z_1 + G12 \cdot \chi_1 + G20 - x_1) +$$
$$G22 \cdot (G21 z_1 + G22 \cdot \chi_1 + G20 - y_1)\}(b-\chi_1) +$$
$$(G11 \cdot z_1 + G12 \cdot \chi_1 + G10 - x_1)^2 +$$
$$(G21 \cdot z_1 + G22 \cdot \chi_1 + G20 - y_1)^2 = 0.$$

Equation (85) may be rearranged in the form $$(J11 \cdot (z-z_1) + J12 \cdot (b-\chi_1) + J10)^2 \pm (J21 \cdot (z-z_1) + J22 \cdot b - \chi_1) + J20)^2 - J30 = 0, \quad (86)$$

where the plus sign (+) or the minus sign (−) is chosen on the left side of Eq. (86) according to the analysis presented in the following.

The coefficients J11, J12, J21, J22 are chosen to satisfy $$J11^2 \pm J21^2 = G11^2 + G12^2 + 1, \quad (87)$$

$$J12^2 \pm J22^2 = G12^2 + G22^2 - 1, \quad (88)$$

$$J11 \cdot J12 + J21 \cdot J22 = G11 \cdot G12 + G21 \cdot G22, \quad (89)$$

$$J10 \cdot J11 + J20 \cdot J21 = G11 \cdot (G11 \cdot z_1 + G12 \cdot_{102\ 1} + G20 - x_1) + G21 \cdot (G21 z_1 + G22 \cdot \chi_1 + G20 - y_1), \quad (90)$$

$$J10 \cdot J12 + J20 \cdot J22 = G12 \cdot (G11 \cdot z_1 + G12 \cdot_{102\ 1} + G20 - x_1) + G22 \cdot (G21 \cdot z_1 + G22 \cdot \chi_1 + G20 - y_1), \quad (91)$$

$$J30 = J10^2 + J20^2 - (G11 \cdot z_1 + G12 \cdot \chi_1 + G20 - x_1)^2 - (G21 \cdot z_1 + G22 \cdot \chi_1 + G20 - y_1)^2, \quad (92)$$

and so that the two lines $$U = J11(z-z_1) + J12 \cdot (b-\chi_1) + J10 = \text{constant} \quad (93)$$

$$V = J21(z-z_1) + J22 \cdot (b-\chi_1) + J20 = \text{constant} \quad (94)$$

are perpendicular to each other. This requires that $$J11 \cdot J21 + J21 \cdot J22 = 0. \quad (95)$$

This perpendicularity requirement can be relaxed by requiring that the two lines defined by Eqs. (93) and (94) intersect each other at a non-zero angle $\theta$ so that $$\{(J11/J12) - (J21/J22)\}/\{1 + (J11 \cdot J21)/(J12 \cdot J22)\} = \tan\theta \neq 0. \quad (96)$$

The four equations (87), (88), (89) and (95) (or (96)) determine the four coefficients J11, J12, J21 and J22. These four coefficients can be re-expressed in terms of the relations $$-(J22/J11)^6 \pm (J22/J11)^4 \cdot \{2 + (G12^2 + G22^2 - 1)/J11^2\} - \qquad (97)$$
$$(J22/J11)^2 \cdot \{1 + 2(G12^2 + G22^2 - 1)/J11^2\} \pm$$
$$(G12^2 + G22^2 - 1)/J11^2 \pm (G11 \cdot G12 + G21 \cdot G22)/J11^4 = 0,$$

$$J12 = (G11 \cdot G12 + G21 \cdot G12 + G21 \cdot G22)/J11 \cdot \{1 \pm (J22/J11)^2\}, \qquad (98)$$

$$J21 = -J12 \cdot (J22/J11), \qquad (99)$$

$$\pm J21^2 = G11^2 + G21^2 + 1 - J11^2, \qquad (100)$$

$$\pm J12^2 = G12^2 + G22^2 - 1 - J22^2, \qquad (101)$$

Equation (97) is a cubic equation in the unknown $(J22/J11)^2$, and the solution of Eq. (97) is expressed in terms of the parameters $X = (G12^2 + G22^2 - 1)/J11^2$ and $Y = (G11 \cdot G12 + G21 \cdot G22)/J11^4$ so that the variable J22 is expressible as a function of the variable J11. The cubic equation (97) has at least one real solution, and it is also required that at least one (real) solution of Eq. (97) be non-negative. Equations (98) and (99) then provide expressions for the variables J12 and J21 solely in terms of the variable J11. Equation (100) or Eq. (101) then provides an equation of the sole remaining variable $J11(\pm)^2$ determined from Eq. (86), which should have at least one real, non-negative solution.

The choice of plus sign or minus sign in Eq. (86) is made partly based upon Eqs. (100) and (101). If the numerical value of $J11(+)^2$ is not greater than the numerical value of $G11^2 + G21^2 + 1$, the plus sign may be chosen in Eq. (86). If the numerical value of $J11(-)^2$ is not less than the numerical value of $G11^2 + G21^2 + 1$, the minus sign in Eq. (86) may be chosen. Similarly, if the numerical value of $J22(+)^2$ is not greater than the numerical value of $G12^2 + G22^2 - 1$, the plus sign may be chosen in Eq. (86); and if the numerical value of $J22(-)^2$ is not less than the numerical value of $G12^2 + G22^2 - 1$, the minus sign in Eq. (86) may be chosen. If J21 has a numerical value of 0, the solutions are simplified to $$J12(\pm) = (G11 \cdot G12 + G21 \cdot G22)/J11(\pm), \qquad (102)$$

$$\pm J22(\pm)^2 = G12^2 + G22^2 - \{(G11 \cdot G12 + G21 \cdot G22)/J11(\pm)\}^2, \qquad (103)$$

$$J11(\pm)^2 = G11^2 + G21^2 + 1. \qquad (104)$$

If J12 has a numerical value of 0, the solutions are simplified to $$J22(\pm)^2 = G12^2 + G22^2 - 1, \qquad (105)$$

$$J21 = (G11 \cdot G12 + G21 \cdot G22)/J22, \qquad (106)$$

$$\pm J21(\pm)^2 = (G11 \cdot G12 + G21 \cdot G22)/\{G12^2 + G22^2 - 1\}^{1/2} = G11^2 + G21^2 + 1 - J11(\pm)^2. \qquad (107)$$

More generally, Eqs. (97)–(101) apply.

The coefficients J30, J10 and J20 are determined by Eq. (92) and $$J10 = \{J22 \cdot \{G11 \cdot (G11 \cdot z_1 + G12 \cdot \chi_1 + G20 - x_1) + \qquad (108)$$
$$G21 \cdot (G21 \cdot z_1 + G22 \cdot \chi_1 + G20 - y_1)\} -$$
$$J21 \cdot \{(G11 \cdot z_1 + G12 \cdot \chi_1 + G20 - x_1) +$$
$$G22 \cdot (G21 \cdot z_1 + G22 \cdot \chi_1 + G20 - y_1)\}\}/$$
$$(J11 \cdot J22 - J12 \cdot J21),$$

$$J20 = \{-J12 \cdot \{G11 \cdot (G11 \cdot z_1 + G12 \cdot \chi_1 + G20 - x_1) + \qquad (109)$$
$$G21 \cdot (G21 \cdot z_1 + G22 \cdot \chi_1 + G20 - y_1)\} +$$
$$J22 \cdot \{(G11 \cdot z_1 + G12 \cdot \chi_1 + G20 - x_1) +$$
$$G22 \cdot (G21 \cdot z_1 + G22 \cdot \chi_1 + G20 - y_1)\}\}/$$
$$(J11 \cdot J22 - J12 \cdot J21).$$

Figure 5:
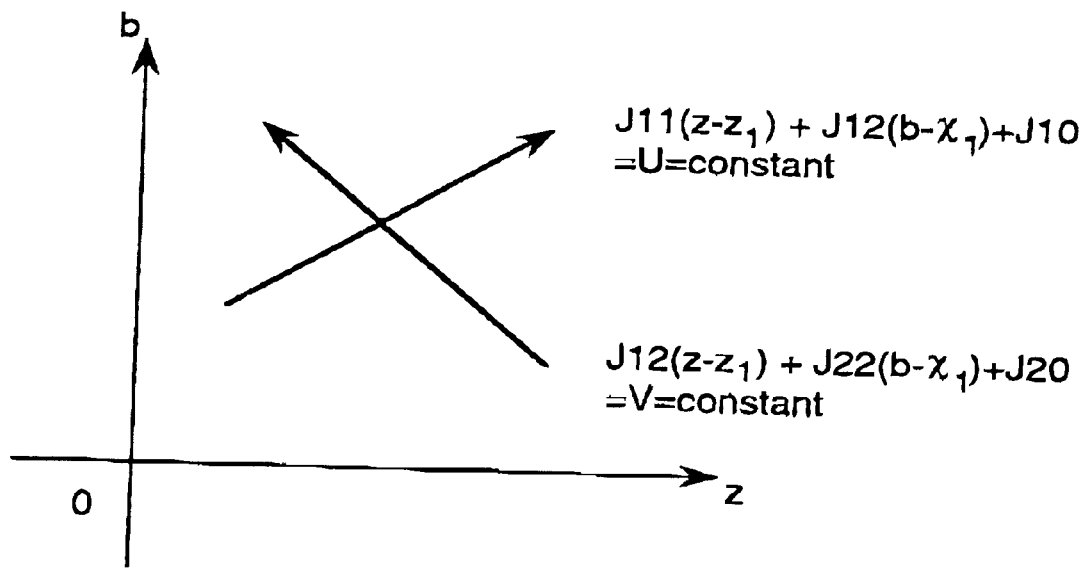
FIG. 5 illustrates determination of a location fix coordinate solution, where only three LD signals are received and processed, in a special case.
Figure 6:
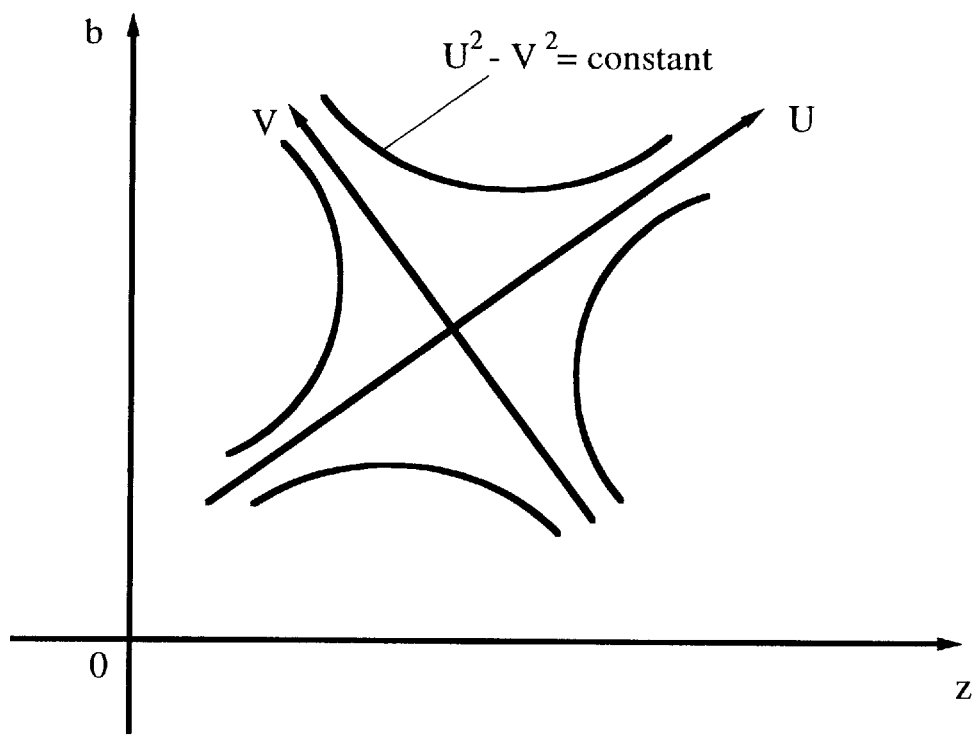
FIGS. 6 and 7 illustrate determination of a location fix coordinate solution, where only three LD signals are received and processed, in two general cases.
Figure 7:
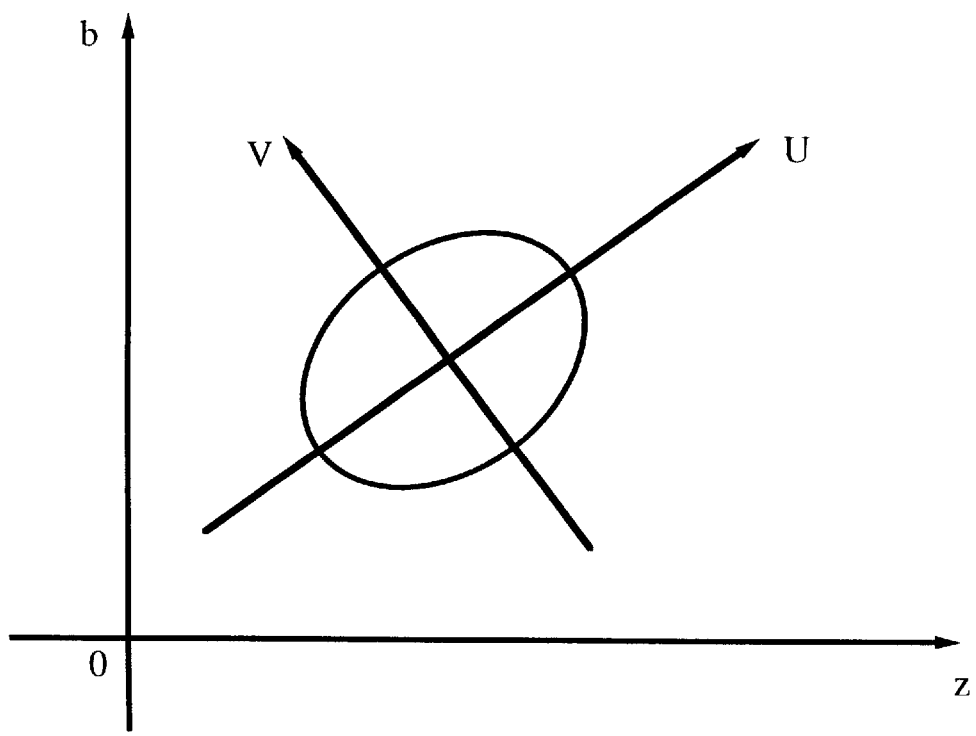

With J11, J12, J21, J22, J10, J20 and J30 thus determined solely in terms of the coefficients G11, G12, G21, G22, G10 and G20, Eq. (86) may be re-expressed as $$U^2 \pm V^2 - J30 = 0, \qquad (110)$$

where new translated and rotated coordinates $$U = J11 \cdot (z - z_1) + J12 \cdot (b - \chi_1) + J10, \qquad (111)$$

$$V = J21 \cdot (z - z_1) + J22 \cdot (b - \chi_1) + J20, \qquad (112)$$

are introduced. If J30=0, the only solution is $$z - z_1 = -(J22 \cdot J10 - J12 \cdot J20)/(J11 \cdot J22 - J12 \cdot J21), \qquad (113)$$

$$b - \chi_1 = -(-J21 \cdot J10 - J11 \cdot J20)/(J11 \cdot J22 - J12 \cdot J21), \qquad (114)$$

as illustrated in FIG. 5. If J30 is non-zero, the solution lies on an ellipse, as illustrated in FIG. 6 (with the choice of plus sign in Eq. (86)) or on one of the two sheets of an hyperbola, as illustrated in FIG. 7 (with the choice of minus sign in Eq. (86)). The location fix coordinates z and b, for a situation where only three usable LD signals are received and processed, lie generally on a curve given by a solution of Eq. (110) (or at the point given by Eqs. (113) and (114)), and the remaining location fix coordinates x and y are determined from Eq. (76). The invention thus provides a location fix coordinate solution where three, four, five, six or more LD signals are received and processed.

The analysis for M location fix coordinates and N LD signals, where N=M−1 and M=2, 3 or 4, is analogous. One obtains a linear relation that relates one or more linear combinations of a first set of (one or more) location fix coordinates one or more other linear combinations of the a second set (the remaining) location fix coordinates, as in Eq. (76). One then obtains a nonlinear relation, usually a quadratic equation, such as Eq. (85) or (86), that relates the location fix coordinates in the second set. A solution of this nonlinear relation may relate one location fix coordinate in the second set to another location fix coordinate in the second set in the sense that the solution of the nonlinear relation (1) lies at the intersection of two nonparallel lines, (2) lies on an ellipse, which may reduce to a circle, or (3) lies on one or more sheets of an hyperbola.

The preceding analyses are presented in detail herein for the choice M=4 location fix coordinates. Where the number M of location fix coordinates to be determined is 2 or 3, the preceding analyses are similarly applicable, with some changes. The situation M=3 corresponds to determination of three location fix coordinates, such as (x,y,z) or (x,y,b), where the deleted location fix coordinate value is either known from other information or the value is not important for the particular application. For M=3, Eq. (11) becomes $$\Delta x_{1,n}(x-x_{1,n}) + \Delta y_{1,n}(y-y_{1,n}) + \Delta z_{1,n} z - z_{1,n} = = A_{1,n} - B_{1,n} b, \quad (b \text{ known}), \tag{115'}$$

if b is known, and becomes $$\Delta x_{1,n}(x-x_{1,n}) + \Delta y_{1,n}(y-y_{1,n}) + \Delta z_{1,n} z - z_{1,n} = = A_{1,n} - B_{1,n} b, \quad (z \text{ known}), \tag{115''}$$

if z is known. Subsequent analysis leads to two formally identical analogs of Eq. (23), viz.

$$\begin{bmatrix} \Delta x_{1,2} & \Delta y_{1,2} & \Delta z_{1,2} \\ \Delta x_{1,3} & \Delta y_{1,3} & \Delta z_{1,3} \\ \Delta x_{1,4} & \Delta y_{1,4} & \Delta z_{1,4} \end{bmatrix} \begin{bmatrix} x \\ y \\ z \end{bmatrix} = \begin{bmatrix} A'_{1,2} - B_{1,2} b \\ A'_{1,3} - B_{1,3} b \\ A'_{1,4} - B_{1,4} b \end{bmatrix}, \quad (b \text{ known}) \tag{116'}$$

or the alternative form $$\begin{bmatrix} \Delta x_{1,2} & \Delta y_{1,2} & \Delta z_{1,2} \\ \Delta x_{1,3} & \Delta y_{1,3} & \Delta z_{1,3} \\ \Delta x_{1,4} & \Delta y_{1,4} & \Delta z_{1,4} \end{bmatrix} \begin{bmatrix} x \\ y \\ z \end{bmatrix} = \begin{bmatrix} A'_{1,2} - B_{1,2} b \\ A'_{1,3} - B_{1,3} b \\ A'_{1,4} - B_{1,4} b \end{bmatrix}, \quad (z \text{ known}) \tag{116''}$$

depending upon which location fix coordinate is deleted. If consideration of a spatial location coordinate, such as z, is deleted, the subsequent Equations (29)–(37) are modified by eliminating all terms that refer to the coordinate z, with the form of these relations remaining the same and the method of solution remaining the same. If consideration of the clock offset parameter b is deleted, the form of Eqs. (29)–(37) also remains the same, but the value of b may be assumed to be known.

Analogous changes are made to the analyses where the number N of LD signal sources is larger than the number M (=3) of location fix coordinates to be determined. If N=M+1, the radius and center of an M-dimensional sphere $S_{1,2,3}$ are determined by analogy with the discussion and analysis in Eqs. (61)–(64) or Eqs. (69)–(74). If N≧M+2, the radius and center of a sphere $S_{a,b,c}$ are determined by analogy with the discussion and analysis of Eqs. (65)–(68) in M-dimensional space. In each instance, a sphere center and a corresponding sphere radius are determined from the pseudorange values, where the location fix coordinates are M-tuple coordinate values that either lie on the sphere surface (N=M+1) or lie on or within the sphere (N≧M+2).

Analogous changes are made to the analyses where the number N of LD signal sources is smaller than the number M (=3) of location fix coordinates to be determined. Equations analogous to Eqs. (75-1)–(114) are obtained.

The preceding analysis for M=3 location fix coordinates extends by analogy to the situation for M=2 location fix coordinates.

In any measurement of pseudorange values, the LD signals are received at the LD antenna and receiver/processor at slightly different receiver times $t = t_{r,n}$ (n=1, . . . , N). By assuming that the same receiver clock offset b is applicable at each of these LD signal arrival times, one implicitly assumes that this clock offset b is constant in the time interval in which the N measurements are made. This assumption is often, but not always, a good approximation. Where the LD receiver clock manifests drift, the clock offset b will vary (modestly, one hopes) with time. For purposes of modeling receiver clock drift, it is assumed that the receiver clock offset time $\Delta t_{r,n}$ varies according to an arbitrary power law, viz.

$$c \, \Delta t_{r,n} = b + a(t_{r,n})^p, \tag{117}$$

where a, b and p are non-zero constants, a and b are unknown and p is known or measurable. If the parameter p is also unknown, pseudorange measurements from one or more additional LD sources are required. If p=0, the preceding situation where clock offset is recovered, with b+a replacing b therein. Equation (3-n) in the Summary is now re-expressed in an expanded form as $$\begin{aligned} PR(t = t_{r,n}; n) + c\Delta t_{r,n} &= ct_{r,n} - c(t_{s,n} - \Delta t_{s,n}) + \\ &\quad I_{r,s,n} + T_{r,s,n} + R_{r,s,n} \\ &= a(t_{r,n})^p + b - \chi(t_{r,n}; t_{s,n}; n) \\ &\approx ([(x - x_n)^2 + (y - y_n)^2 + (z - z_n)^2])^{1/2}, \\ &\approx ([(x - x_n)^2 + (y - y_n)^2 + (z - z_n)^2])^{1/2}, \end{aligned} \tag{118-n}$$

where $\chi(t_{r,n}; t_{s,n}; n)$ is defined in Eq. (4) and includes only known numerical terms. Forming the difference of the sum of the squares of Eq. (118-n) for n=m and n=k, the analog of Eq. (14) becomes $$\Delta x_{m,k}(x - x_{m,k}) + \Delta y_{m,k}(y - y_{m,k}) + \Delta z_{m,k}(z - z_{m,k}) = = A_{m,k} a^2 + B_{m,k} ab + C_{m,k} a + D_{m,k} b + E_{m,k}, \tag{119}$$

$$A_{m,k} = (t_{r,m})^{2p} - (t_{r,k})^{2p}, \tag{120}$$

$$B_{m,k} = 2[(t_{r,m})^p - (t_{r,k})^p], \tag{121}$$

$$C_{m,k} = -2([(t_{r,m})^p \chi(t_{r,m}; t_{s,m}; m) - (t_{r,k})^p \chi(t_{r,k}; t_{s,k}; k)], \tag{122}$$

$$D_{m,k} = -2[\chi(t_{r,m}; t_{s,m}; m) - \chi(t_{r,k}; t_{s,k}; k)], \tag{123}$$

$$E_{m,k} = \chi(t_{r,m}; t_{s,m}; m)^2 - \chi(t_{r,k}; t_{s,k}; k)^2, \tag{124}$$

where $A_{m,k}$, $B_{m,k}$, $C_{m,k}$, $D_{m,k}$ and $E_{m,k}$ are computed numerical quantities and are known. For this formulation, LD signals from a minimum of N=5 LD signal sources must be received and processed, and no four LD signal sources should lie in a common plane.

By forming differences of the different relations (119), these relations are reduced a matrix relation of the form $$H'''R' = (A''' - B'''b), \tag{125}$$

$$R' = \begin{bmatrix} x \\ y \\ z \\ a \end{bmatrix}, \tag{126}$$

where H''' is an invertible 4×4 matrix and A''' and B''' are known 4×1 column matrices. Equation (117) is inverted to read $$R' = (H''')^{-1} (A''' - B'''b), \tag{127}$$

and Eq. (125) is inserted into the square of one of Eqs. (3-n), or into a linear combination of the Eqs. (1), as in the preceding discussion, to produce a quadratic equation in b of the form $$E''b^2 + 2F''b + G'' = 0, \tag{128}$$

where E", F" and G" have known numerical values. The quadratic equation (128) should provide at least one realistic solution for b ($|b|$ relatively small), and this solution is inserted into Eq. (127) to produce the location coordinates x, y and z and the remaining clock offset parameter a. Equations (125) and (126) may be rearranged to express any one of the location fix coordinates x, y, z, a and b as a linear combination of the other four location fix coordinates, by analogy with Eqs. (125) and (126).

In many circumstances, manipulation of Eq. (119), which contains the unknown parameter combinations $a^2$ and ab, to produce the relation (123) that is linear in the parameters a and b requires a minimum of N=6 visible LD signal sources. In fortuitous circumstances, a minimum of N=5 LD signal sources will suffice here.

The preceding discussion covers several related approaches for determining exact solutions of equations for pseudorange measurements received in an LD system, including solutions where the receiver clock offset is not constant in time. Use of such an approach allows use of less precise (and less expensive) receiver clocks in the LD receiver/processor that determines the present location coordinates and clock offset parameter(s) for the LD antenna. Because this exact solution approach does not require iteration, determination of present location coordinates for an LD signal antenna should occur more quickly and should allow use of less complex (and less expensive) microprocessors in the LD receiver/processors. Use of such an approach also allows explicit treatment, without use of iterative computation, of situations in which the number N of LD signals received is greater than, or less than, the minimum number of such signals required for exact solution of the pseudorange equations.

After the solution coordinates (x,y,z,b) or (x,y,z,b,a) are determined for the LD signal antenna for a time approximately equal to $t=t_{r,n}$ (or to $t=\{t_{r,1}+ \ldots +t_{r,N}\}/N$), these coordinates can be displayed numerically and/or graphically and/or audibly on a suitable display for use by a user of the LD station 11.

Figure 3:
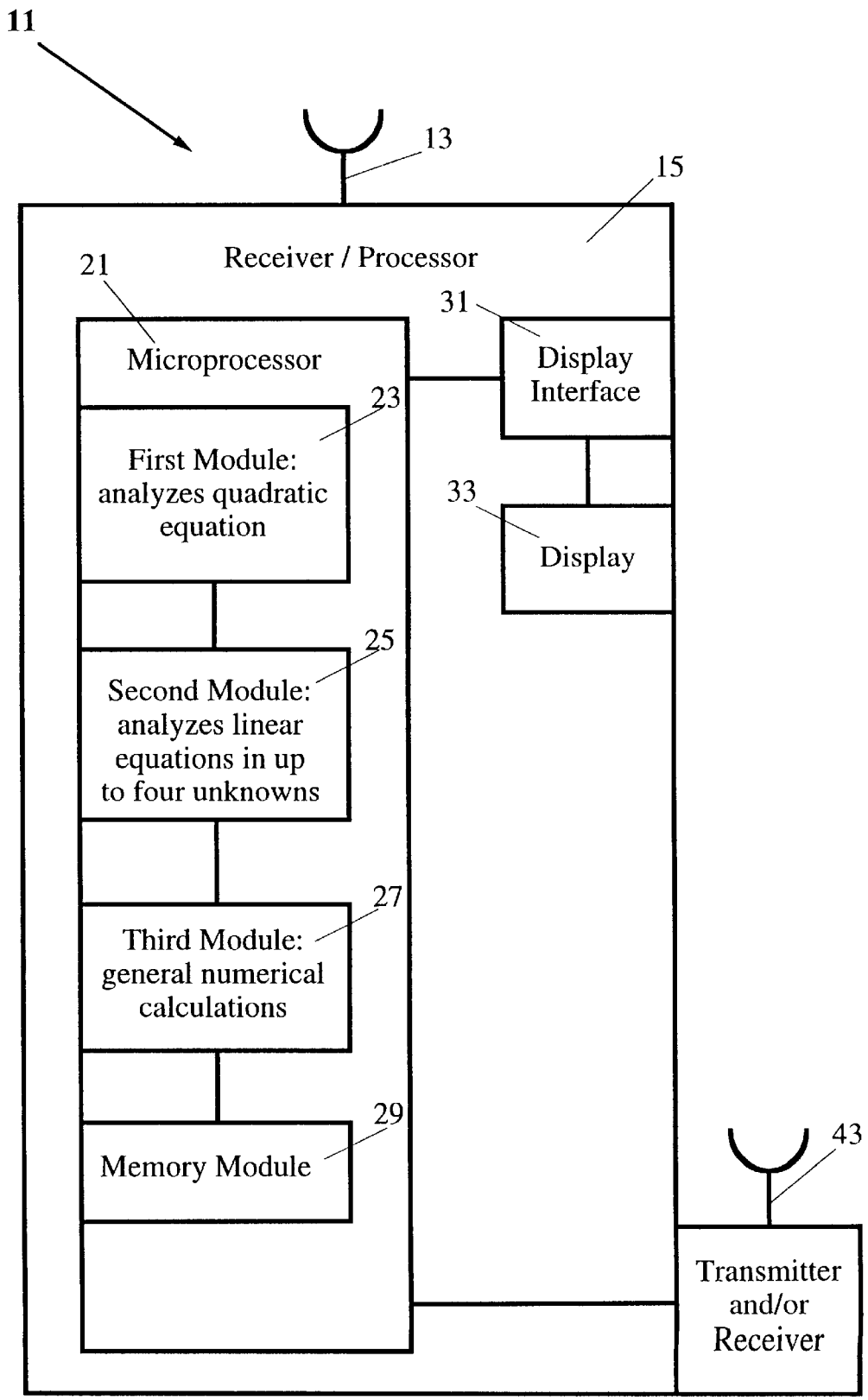
FIG. 3 illustrates apparatus suitable for practicing the invention.

FIG. 3 illustrates an embodiment of LD station apparatus 11 that is suitable for practicing the invention. The LD station apparatus 11 includes an LD signal antenna 13 and an LD signal receiver/processor 15. The LD receiver/processor 15 includes a microprocessor 21 that includes: a first programmed module 23 that receives, analyzes and determines the solution of a quadratic equation in one unknown; a second programmed module 25 that receives, analyzes and determines the solution of up to four linear equations in four unknowns; a third programmable module 27 for general numerical calculations; a memory module 29 for receiving and storing the location coordinates $(x_n, y_n, z_n)$ (n=1, ..., N; N≥2) for each of N LD signal sources (e.g., SATPS satellites or ground-based LD signal towers) at a selected sequence of times for each LD source, and for receiving and temporarily storing numerical values therein. The LD receiver/processor 15 also includes an optional display interface 31 and an optional display 33, connected to the microprocessor 21, for presenting a visually perceptible (numerical or graphical) display or an audibly perceptible display of the location coordinates (x,y,z) and/or the clock offset parameters b and/or a, determined using the invention disclosed above. Optionally, the LD station apparatus 11 also includes a transmitter and/or receiver 41 and associated antenna 43, connected to the LD receiver/processor 15, for transmitting signals to and/or receiving signals from another receiver and/or transmitter that is spaced apart from the LD station 11.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System. A useful discussion of the GPS and techniques for obtaining position information from the satellite signals is found in Tom Logsdon, *The NAVSTAR Global Positioning System,* Van Nostrand Reinhold, New York, 1992, pp. 1–90.

A configuration of two or more receivers, with one receiver having a known location, can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

I claim:

1. A method for determining the location of a location determination (LD) station, the method comprising the steps of:

receiving LD signals from a plurality of LD signal sources at an LD station and determining a pseudorange value between the LD station and each LD signal source, where the number of LD signal sources is less than the number of location fix coordinates for the LD station to be determined;

processing the pseudorange values to produce at least one exact linear relation relating at least first and second location fix coordinates for the LD station without iteration; and using the at least one linear relation together with at least one pseudorange value to obtain at least one exact non-linear relation relating the at least first and second location fix coordinates without iteration.

2. The method of claim 1, wherein said steps of obtaining and using said at least one nonlinear relation comprises the step of obtaining first and second linear relations relating said first location fix coordinate to said second location fix coordinate, where the first and second linear relations define first and second straight lines having an intersection point.

3. The method of claim 2, wherein said steps of obtaining and using said at least one nonlinear relation further comprises the step of interpreting said intersection point of said first and second straight lines as part of said location fix coordinate solution.

4. The method of claim 2, wherein said steps of obtaining and using said at least one nonlinear relation further comprises the steps of:

obtaining said at least one nonlinear relation as an ellipse, with major and minor axes referenced to said first and second lines defined by said first and second linear relations; and using the ellipse to relate said first location fix coordinate to said second location fix coordinate.

5. The method of claim 2, wherein said steps of obtaining and using said at least one nonlinear relation further comprises the steps of:

obtaining said at least one nonlinear relation as at least one sheet of an hyperbola, with hyperbola axes referenced to said first and second lines defined by said first and second linear relations; and using the at least one sheet of an hyperbola to relate said first location fix coordinate to said second location fix coordinate.

6. The method of claim 1, wherein said step of processing the pseudorange values to obtain said at least one exact linear relation comprises the steps of:

measuring a pseudorange value $PR(t=t_{r,n};\ t_{s,n};\ n)$ associated with an LD signal transmitted by LD source number n (n=1, 2, . . . , N), where N is a selected integer at least equal to 4, at a selected time $t=t_{s,n}$ and received at said LD station at a selected receive time $t=t_{r,n}$, where the receive times $t_{r,n}$ (n=1, 2, . . . , N) are approximately equal, where the pseudorange value for an LD signal received from LD signal source number n at the time $t=t_{r,n}$ is represented approximately by a pseudorange equation of the form $$PR(t=t_{r,n};\ t_{s,n};\ n)+b=d_n=\{(x-x_n)^2+(y-y_n)^2+(z-z_n)^2\}^{1/2}==b-\chi(t_{r,n};\ t_{s,n};\ n),$$

that relates a distance $d_n$ from the LD signal source number n, having approximately known spatial location coordinates $(x_n,y_n,z_n)=(x_n(t_{s,n}),y_n(t_{s,n}),z_n(t_{s,n}))$ at the selected time $t=t_{s,n}$, to the LD station, which has initially unknown spatial location coordinates (x,y,z), where $b/c=\Delta t_{r,n}$ is an initially unknown error in the clock coordinate of the LD station, where $\chi(t_{r,n};\ t_{s,n};\ n)$ is a selected term with a known value that is determined from the measured pseudorange value for a signal transmitted from LD signal source number n and that compensates for at least one of (i) time delay, $I_{r,s,n}$, for propagation of an LD signal in the ionosphere, (ii) time delay, $T_{r,s,n}$, for LD signal propagation in the troposphere, and (iii) clock error $\Delta t_{s,n}$ associated with LD signal source number n, and where x, y, z and b are location solution coordinates to be determined; and processing the pseudorange equations for the pseudorange values $PR(t=t_{r,n};\ t_{s,n};\ n)$ to produce at least three exact linear relations relating the location solution coordinates x, y, z and b, where the coefficients of these three linear relations are determinable from the selected terms $y(t_{r,n};\ t_{s,n};\ n)$ and are independent of the values of the location solution coordinates x, y, z and b.

7. The method of claim 6, wherein said step of using said linear relation to obtain a non-linear relation comprises the steps of:

using said at least three linear relations relating said location solution coordinates x, y, z and b, together with at least one of said pseudorange representation equations for said pseudorange values $PR(t=t_{r,n};\ t_{s,n};\ n)$, to generate an exact equation that is nonlinear in the unknown value for a selected one of said location solution coordinates x, y, z and b and that does not depend on the values of said other three location solution coordinates;

determining a selected coordinate value from a solution of the nonlinear equation for the selected location solution coordinate, and using the selected location solution coordinate value in said three linear relations relating said location solution coordinates x, y, z and b to determine values of said other three location solution coordinates; and interpreting the values determined for said location solution coordinates x, y, z and b as the spatial location coordinates and receiver/processor clock error coordinate for said LD signal station at the time $t=t_{r,n}$.

8. The method of claim 1, wherein said step of processing the pseudorange values to obtain said at least one exact linear relation comprises the steps of:

measuring a pseudorange value $PR(t=t_{r,n};\ t_{s,n};\ n)$ associated with an LD signal transmitted by LD source number n (n=1, 2, . . . , N), where N is a selected integer at least equal to 3, at a selected time $t=t_{s,n}$ and received at said LD station at a selected receive time $t=t_{r,n}$, where the receive times $t_{r,n}$ (n=1, 2, . . . , N) are approximately equal, where the pseudorange value for an LD signal received from LD signal source number n at the time $t=t_{r,n}$ is represented approximately by a pseudorange equation of the form $$PR(t=t_{r,n};\ t_{s,n};\ n)+b=d_n=\{(x-x_n)^2+(y-y_n)^2+(z-z_n)^2\}^{1/2}==b-\chi(t_{r,n};\ t_{s,n};\ n),$$

that relates a distance $d_n$ from the LD signal source number n, having approximately known spatial location coordinates $(x_n,y_n,z_n)=(x_n(t_{s,n}),y_n(t_{s,n}),z_n(t_{s,n}))$ at the selected time $t=t_{s,n}$, to the LD station, which has initially unknown spatial location coordinates (x,y,z), where $b/c=\Delta t_{r,n}$ is an error in the clock coordinate of the LD station, where $\chi(t_{r,n};\ t_{s,n};\ n)$ is a selected term with a known value that is determined from the measured pseudorange value for a signal transmitted from LD signal source number n and that compensates for at least one of (i) time delay, $I_{r,s,n}$, for propagation of an LD signal in the ionosphere, (ii) time delay, $T_{r,s,n}$, for LD signal propagation in the troposphere, and (iii) clock error $\Delta t_{s,n}$ associated with LD signal source number n, and where x, y and z are location solution coordinates to be determined; and processing the pseudorange equations for the pseudorange values $PR(t=t_{r,n};\ t_{s,n};\ n)$ to produce at least two exact linear relations relating the location solution coordinates x, y and z, where the coefficients of the two linear relations are determinable from the selected terms $\chi(t_{r,n};\ t_{s,n};\ n)$ and are independent of the values of the location solution coordinates x, y and z.

9. The method of claim 8, wherein said step of using said linear relations to obtain a non-linear relation comprises the steps of:

using said at least two linear relations relating said location solution coordinates x, y and z, together with at least one of said pseudorange representation equations for said pseudorange values $PR(t=t_{r,n};\ t_{s,n};\ n)$, to generate an exact equation that is nonlinear in the unknown value for a selected one of said location solution coordinates x, y and z and that does not depend on the values of said other two location solution coordinates;

determining a selected coordinate value from a solution of the nonlinear equation for the selected location solution coordinate, and using the selected location solution coordinate value in said two linear relations relating said location solution coordinates x, y and z to determine values of said other two location solution coordinates; and interpreting the values determined for said location solution coordinates x, y and z as the spatial location coordinates for said LD signal station at the time $t=t_{r,n}$.

10. The method of claim 1, wherein said step of processing the pseudorange values to obtain said at least one exact linear relation comprises the steps of:

measuring a pseudorange value $PR(t=t_{r,n};\ t_{s,n};\ n)$ associated with an LD signal transmitted by LD source number n (n=1, 2, . . . , N), where N is a selected integer at least equal to 3 at a selected time $t=t_{s,n}$ and received at said LD station at a selected receive time $t=t_{r,n}$, where the receive times $t_{r,n}$ (n=1, 2, . . . , N) are approximately equal, where the pseudorange value for an LD signal received from LD signal source number n at the time $t=t_{r,n}$ is represented approximately by a pseudorange equation of the form $$PR(t=t_{r,n};\ t_{s,n};\ n)+b=d_n=\{(x-x_n)^2+(y-y_n)^2+(z-z_n)^2\}^{1/2}==b-\chi(t_{r,n};\ t_{s,n};\ n),$$

that relates a distance $d_n$ from the LD signal source number n, having approximately known spatial location coordinates $(x_n,y_n,z_n)=(x_n(t_{s,n}),y_n(t_{s,n}),z_n(t_{s,n}))$ at the selected time $t=t_{s,n}$, to the LD station, which has initially unknown spatial location coordinates (x,y), where $b/c=\Delta t_{r,n}$ is an initially unknown error in the clock coordinate of the LD station, where $\chi(t_{r,n};\ t_{s,n};\ n)$ is a selected term with a known value that is determined from the measured pseudorange value for a signal transmitted from LD signal source number n and that compensates for at least one of (i) time delay, $I_{r,s,n}$, for propagation of an LD signal in the ionosphere, (ii) time delay, $T_{r,s,n}$, for LD signal propagation in the troposphere, and (iii) clock error $\Delta t_{s,n}$ associated with LD signal source number n, and where x, y and b are location solution coordinates to be determined; and processing the pseudorange equations for the pseudorange values $PR(t=t_{r,n};\ t_{s,n};\ n)$ to produce at least two exact linear relations relating the location solution coordinates x, y and b, where the coefficients of the two linear relations are determinable from the selected terms $\chi(t_{r,n};\ t_{s,n};\ n)$ and are independent of the values of the location solution coordinates x, y and b.

11. The method of claim 10, wherein said step of using said linear relations to obtain a non-linear relation comprises the steps of:

using said at least two linear relations relating said location solution coordinates x, y and z, together with at least one of said pseudorange representation equations for said pseudorange values $PR(t=t_{r,n};\ t_{s,n};\ n)$, to generate an exact equation that is nonlinear in the unknown value for a selected one of said location solution coordinates x, y and b and that does not depend on the values of said other two location solution coordinates;

determining a selected coordinate value from a solution of the nonlinear equation for the selected location solution coordinate, and using the selected location solution coordinate value in said two linear relations relating said location solution coordinates x, y and b to determine values of said other two location solution coordinates; and interpreting the values determined for said location solution coordinates x, y and b as the spatial location coordinates and receiver/processor clock error coordinate for said LD signal station at the time $t=t_{r,n}$.

12. The method of claim 1, wherein said step of processing the pseudorange values to obtain said at least one exact linear relation comprises the steps of:

measuring a pseudorange value $PR(t=t_{r,n};\ t_{s,n};\ n)$ associated with an LD signal transmitted by LD source number n (n=1, 2, . . . , N), where N is a selected integer at least equal to 2 at a selected time $t=t_{s,n}$ and received at said LD station at a selected receive time $t=t_{r,n}$, where the receive times $t_{r,n}$ (n=1, 2, . . . , N) are approximately equal, where the pseudorange value for an LD signal received from LD signal source number n at the time $t=t_{r,n}$ is represented approximately by a pseudorange equation of the form $$PR(t=t_{r,n};\ t_{s,n};\ n)+b=d_n=\{(x-x_n)^2+(y-y_n)^2+(z-z_n)^2\}^{1/2}==b-\chi(t_{r,n};\ t_{s,n};\ n),$$

that relates a distance $d_n$ from the LD signal source number n, having approximately known spatial location coordinates $(x_n,y_n,z_n)=(x_n(t_{s,n}),y_n(t_{s,n}),z_n(t_{s,n}))$ at the selected time $t=t_{s,n}$, to the LD station, which has initially unknown spatial location coordinates (x,y), where $b/c=\Delta t_{r,n}$ is an error in the clock coordinate of the LD station, where $y(t_{r,n};\ t_{s,n};\ n)$ is a selected term with a known value that is determined from the measured pseudorange value for a signal transmitted from LD signal source number n and that compensates for at least one of (i) time delay, $I_{r,s,n}$, for propagation of an LD signal in the ionosphere, (ii) time delay, $T_{r,s,n}$, for LD signal propagation in the troposphere, and (iii) clock error $\Delta t_{s,n}$ associated with LD signal source number n, and where x and y are location solution coordinates to be determined; and processing the pseudorange equations for the pseudorange values $PR(t=t_{r,n};\ t_{s,n};\ n)$ to produce said at least one exact linear relation relating the location solution coordinates x and y, where the coefficients of the linear relation are determinable from the selected terms $\chi(t_{r,n};\ t_{s,n};\ n)$ and are independent of the values of the location solution coordinates x and y.

13. The method of claim 12, wherein said step of using said linear relations to obtain a non-linear relation comprises the steps of:

using said at least two linear relations relating said location solution coordinates x and y, together with at least one of said pseudorange representation equations for said pseudorange values $PR(t=t_{r,n};\ t_{s,n};\ n)$, to generate an exact equation that is nonlinear in the unknown value for a selected one of said location solution coordinates x and y and that does not depend on the values of said other location solution coordinate;

determining a selected coordinate value from a solution of the nonlinear equation for the selected location solution coordinate, and using the selected location solution coordinate value in said two linear relations relating said location solution coordinates x and y to determine values of said other two location solution coordinates; and interpreting the values determined for said location solution coordinates x and y as the spatial location coordinates for said LD signal station at the time $t=t_{r,n}$.

14. The method of claim 1, wherein said step of processing the pseudorange values to obtain said at least one exact linear relation comprises the steps of:

measuring a pseudorange value $PR(t=t_{r,n};\ t_{s,n};\ n)$ associated with an LD signal transmitted by LD source number n (n=1, 2, . . . , N), where N is a selected integer at least equal to 2 at a selected time $t=t_{s,n}$ and received at said LD station at a selected receive time $t=t_{r,n}$, where the receive times $t_{r,n}$ (n=1, 2, . . . , N) are approximately equal, where the pseudorange value for an LD signal received from LD signal source number n at the time $t=t_{r,n}$ is represented approximately by a pseudorange equation of the form $$PR(t=t_{r,n};\ t_{s,n};\ n)+b=d_n=\{(x-x_n)^2+(y-y_n)^2+(z-z_n)^2\}^{1/2}==b-\chi(t_{r,n};\ t_{s,n};\ n),$$

that relates a distance $d_n$ from the LD signal source number n, having an approximately known spatial location coordinates $(x_n,y_n,z_n)=(x_n(t_{s,n}),y_n(t_{s,n}),z_n(t_{s,n}))$ at the selected time $t=t_{s,n}$, to the LD station, which has an initially unknown spatial location coordinate x, where $b/c=\Delta t_{r,n}$ is an initially unknown error in the clock coordinate of the LD station, where $\chi(t_{r,n}; t_{s,n}; n)$ is a selected term with a known value that is determined from the measured pseudorange value for a signal transmitted from LD signal source number n and that compensates for at least one of (i) time delay, $I_{r,s,n}$, for propagation of an LD signal in the ionosphere, (ii) time delay, $T_{r,s,n}$, for LD signal propagation in the troposphere, and (iii) clock error $\Delta t_{s,n}$ associated with LD signal source number n, and where x and b are location solution coordinates to be determined; and processing the pseudorange equations for the pseudorange values $PR(t=t_{r,n}; t_{s,n}; n)$ to produce at least one exact linear relation relating the location solution coordinates x and b, where the coefficients of the linear relation are determinable from the selected terms $\chi(t_{r,n}; t_{s,n}; n)$ and are independent of the values of the location solution coordinates x and b.

15. The method of claim 14, wherein said step of using said linear relation to obtain a non-linear relation comprises the steps of:

using said at least one linear relation relating said location solution coordinates x and b, together with at least one of said pseudorange representation equations for said pseudorange values $PR(t=t_{r,n}; t_{s,n}; n)$, to generate an exact equation that is nonlinear in the unknown value for a selected one of said location solution coordinates x and b that does not depend on the values of said other location solution coordinate;

determining a selected coordinate value from a solution of the nonlinear equation for the selected location solution coordinate, and using the selected location solution coordinate value in said linear relation relating said location solution coordinates x and b to determine values of said other location solution coordinate; and interpreting the values determined for said location solution coordinates x and b as the spatial location coordinate and receiver/processor clock error coordinate for said LD signal station at the time $t=t_{r,n}$.

16. A method for determining the location of a location determination (LD) station, the method comprising the steps of:

receiving LD signals from N LD signal sources ($N \geq 2$) at an LD station and determining a pseudorange value between the LD station and each LD signal source, where the number of LD signal sources is greater than the number of location fix coordinates, M, for the LD station to be determined;

processing the pseudorange values to produce at least one exact M relations relating location fix coordinates for the LD station; and using the at least M linear relations together with at least one pseudorange value to obtain at least one exact non-linear relation relating at least first and second location fix coordinates; and using the at least one nonlinear relation to relate the first location fix coordinate to the second location fix coordinate without iteration.

17. The method of claim 16, further comprising the steps of:

determining a sphere center and a sphere radius in an M-dimensional space with a sphere surface that encloses at least M+1 location fix coordinate M-tuples; and interpreting said location fix coordinates corresponding to the sphere center as an estimate of said location fix coordinates to be determined.

18. The method of claim 16, further comprising the steps of:

determining a sphere center and a sphere having a minimum radius in an M-dimensional space that encloses at least M+2 location fix coordinate M-tuples; and interpreting said location fix coordinates corresponding to the sphere center as an estimate of said location fix coordinates to be determined.

19. The method of claim 16, wherein said step of processing the pseudorange values to obtain said at least one exact linear relation comprises the steps of:

measuring a pseudorange value $PR(t=t_{r,n}; t_{s,n}; n)$ associated with an LD signal transmitted by LD source number n (n=1, 2, ..., N), where N is a selected integer at least equal to 3, at a selected time $t=t_{s,n}$ and received at said LD station at a selected receive time $t=t_{r,n}$, where the receive times $t_{r,n}$ (n=1, 2, ..., N) are approximately equal, where the pseudorange value for an LD signal received from LD signal source number n at the time $t=t_{r,n}$ is represented approximately by a pseudorange equation of the form $$PR(t=t_{r,n}; t_{s,n}; n)+b=d_n=\{(x-x_n)^2+(y-y_n)^2+(z-z_n)^2\}^{1/2}==b-\chi(t_{r,n}; t_{s,n}; n),$$

that relates a distance $d_n$ from the LD signal source number n, having approximately known spatial location coordinates $(x_n,y_n,z_n)=(x_n(t_{s,n}),y_n(t_{s,n}),z_n(t_{s,n}))$ at the selected time $t=t_{s,n}$, to the LD station, which has initially unknown spatial location coordinates (x,y,z), where $b/c=\Delta t_{r,n}$ is an initially unknown error in the clock coordinate of the LD station, where $\chi(t_{r,n}; t_{s,n}; n)$ is a selected term with a known value that is determined from the measured pseudorange value for a signal transmitted from LD signal source number n and that compensates for at least one of (i) time delay, $I_{r,s,n}$, for propagation of an LD signal in the ionosphere, (ii) time delay, $T_{r,s,n}$, for LD signal propagation in the troposphere, and (iii) clock error $\Delta t_{s,n}$ associated with LD signal source number n, and where x, y, z and b are location solution coordinates to be determined; and processing the pseudorange equations for the pseudorange values $PR(t=t_{r,n}; t_{s,n}; n)$ to produce at least three linear relations relating the location solution coordinates x, y, z and b, where the coefficients of these three linear relations are determinable from the selected terms $\chi(t_{r,n}; t_{s,n}; n)$ and are independent of the values of the location solution coordinates x, y, z and b.

20. The method of claim 19, wherein said step of using said exact linear relation to obtain said non-linear relation comprises the steps of:

using said three linear relations relating said location solution coordinates x, y, z and b, together with at least one of said pseudorange representation equations for said pseudorange values $PR(t=t_{r,n}; t_{s,n}; n)$, to generate an equation that is nonlinear in the unknown value for a selected one of said location solution coordinates x, y, z and b that does not depend on the values of said other three location solution coordinates;

determining a selected coordinate value from a solution of the nonlinear equation for the selected location solution coordinate, and using the selected location solution coordinate value in said three linear relations relating said location solution coordinates x, y, z and b to determine values of said other three location solution coordinates; and interpreting the values determined for said location solution coordinates x, y, z and b as the spatial location coordinates and receiver/processor clock error coordinate for said LD signal station at the time $t=t_{r,n}$.

21. A method for determining the location of a location determination (LD) station, the method comprising the steps of:

(1) receiving and processing LD signals at an LD station from N LD signal sources, numbered n=1, 2, . . . , N (N≧2) and spaced apart from the LD unit, where the LD station can determine the location of the LD station from the LD signals received and where the number of LD signal sources is less than the number M of location fix coordinates for the LD station to be determined;

(2) measuring a pseudorange value $PR(t=t_{r,n}; t_{s,n}; n)$ associated with an LD signal transmitted by LD source number n (n=1, 2, . . . , N) at a selected time $t=t_{s,n}$ and received at the LD station at a selected receive time $t=t_{r,n}$, where the receive times $t_{r,n}$ (n=1, 2, . . . , N) are approximately equal, where the pseudorange value for an LD signal received from LD signal source number n at the time $t=t_{r,n}$ is represented approximately by a pseudorange equation of the form $$PR(t=t_{r,n}; t_{s,n}; n)+b=d_n=\{(x-x_n)^2+(y-y_n)^2+(z-z_n)^2\}^{1/2}=b-\chi(t_{r,n}; t_{s,n}; n),$$

that relates a distance $d_n$ from the LD signal source number n, having approximately known spatial location coordinates $(x_n,y_n,z_n)=(x_n(t_{s,n})y_n(t_{s,n}),z_n(t_{s,n}))$ at the selected time $t=t_{s,n}$, to the LD unit, which has initially unknown spatial location coordinates (x,y,z), where $b/c=\Delta t_{r,n}$ is an initially unknown error in the clock coordinate of the LD signal station, where $\chi(t_{r,n}; t_{s,n}; n)$ is a selected term with a known value that is determined from the measured pseudorange value for a signal transmitted from LD signal source number n and that compensates for at least one of (i) time delay, $I_{r,s,n}$, for propagation of an LD signal in the ionosphere, (ii) time delay, $T_{r,s,n}$, for LD signal propagation in the troposphere, and (iii) clock error $\Delta t_{s,n}$ associated with LD signal source number n, and where x, y, z and b are location solution coordinates to be determined;

(3) processing the pseudorange equations for the pseudorange values $PR(t=t_{r,n}; t_{s,n}; n)$ to produce at least N-1 exact linear relations relating selected combinations of location fix coordinates x, y, z and b for the LD station, where the coefficients of these N-1 linear relations are determinable from values of selected terms $\chi(t_{r,n}; t_{s,n}; n)$ and are independent of the values of the location fix coordinates;

(4) using the N-1 linear relations relating the location fix coordinates, together with at least one of the pseudorange representation equations for the pseudorange values $PR(t=t_{r,n}; t_{s,n}; n)$, to obtain at least one relation that is nonlinear in the unknown values for selected first and second location fix coordinates and that does not depend on the values of other location solution coordinates;

(5) determining values for the selected first and second location fix coordinates that approximately satisfy the nonlinear relation for the selected first and second location fix coordinates, and using the selected first and second location fix coordinate values together with the N-1 linear relations relating the selected combinations of location fix coordinates to determine values of other location fix coordinates; and (6) interpreting the N values determined for the location fix coordinates as location fix coordinates for the LD station at the time $t=t_{r,n}$.

22. The method of claim 21, wherein M is chosen equal to N-1, and wherein said step of obtaining said at least one nonlinear relation comprises the step of obtaining first and second exact linear relations relating said selected first location fix coordinate to said selected second location fix coordinate, where the first and second linear relations define first and second straight lines having an intersection point.

23. The method of claim 22, wherein said step of determining said values for said selected first and second location coordinates comprises interpreting said intersection point of said first and second straight lines as part of a solution for said location fix coordinate values.

24. The method of claim 22, wherein said step of determining said values for said selected first and second location coordinates comprises:

obtaining said at least one nonlinear relation as an ellipse, with major and minor axes referenced to said first and second lines defined by said first and second linear relations; and using the ellipse to relate said selected first location fix coordinate values to said selected second location fix coordinate value.

25. The method of claim 22, wherein said step of determining said values for said selected first and second location coordinates comprises:

obtaining said at least one nonlinear relation as at least one sheet of an hyperbola, with hyperbola axes referenced to said first and second lines defined by said first and second linear relations; and using the at least one sheet of an hyperbola to relate said first location fix coordinate to said second location fix coordinate.

26. The method of claim 21, further comprising the step of expressing said selected term $\chi(t_{r,n}; t_{s,n}; n)$ (n=1, 2, . . . , N) as a sum $$\chi(t_{r,n}; t_{s,n}; n)=-c(t_{s,n}+\Delta t_{s,n}-t_{r,n})-I_{r,s,n}-T_{r,s,n}-R_{r,s,n},$$

where $R_{r,s,n}$ is a residual time delay for propagation of an LD signal from LD signal source number n to said LD signal antenna.

27. The method of claim 21, wherein said integer M=4, further comprising the step of expressing said at least three linear relations relating said solution location coordinates in the form $$H_{11}x+H_{12}y+H_{13}z=A'_{1,2}-B_{1,2}b,$$

$$H_{21}x+H_{22}y+H_{23}z=A'_{1,3}-B_{1,3}b,$$

$$H_{31}x+H_{32}y+H_{33}z=A'_{1,4}-B_{1,4}b,$$

where the coefficients $H_{ij}$ (i=1,2,3; j=1,2,3) are determined by said spatial location coordinates $(x_n,y_n,z_n)$ of said LD signal sources at said selected times $t=t_{s,n}$, and the coefficients $A'_{1,i}$(i=2,3,4) and $B_{1,i}$(i=2,3,4) are determined by said selected terms $\chi(t_{r,n}; t_{s,n}; n)$.

28. The method of claim 21, wherein said integer M=3, further comprising the step of expressing said at least three linear relations relating said solution location coordinates in the form $$H_{11}x+H_{12}y=A'_{1,2}-B_{1,2}b,$$

$$H_{21}x + H_{22}y = A'_{1,3} - B_{1,3}b,$$

where the coefficients $H_{ij}$ (i=1,2; j=1,2) are determined by said spatial location coordinates $(x_n, y_n)$ of said LD signal sources at said selected times $t = t_{s,n}$, and the coefficients $A'_{1,i}$(i=2,3) and $B_{1,i}$(i=2,3) are determined by said selected terms $\chi(t_{r,n}; t_{s,n}; n)$.

29. A method for determining the location of a location determination (LD) station, the method comprising the steps of:

receiving LD signals from N LD signal sources (N≧2) at an LD station and determining a pseudorange value between the LD station and each LD signal source, where the number of LD signal sources is greater than the number of location fix coordinates, M, for the LD station to be determined;

processing the pseudorange values to produce at least M exact linear relations relating location fix coordinates for the LD station;

using the at least M linear relations together with at least one pseudorange value to obtain at least one exact non-linear relation relating at least first and second location fix coordinates; and using the at least M linear relations and the at least one nonlinear relation to estimate at least M+1 location fix coordinate M-tuples.

30. The method of claim 29, further comprising the steps of:

choosing said number N equal to M+1;

determining a sphere center and a sphere radius in an M-dimensional space with a sphere surface that encloses said at least M+1 location fix coordinate M-tuples; and interpreting said location fix coordinates corresponding to the sphere center as an estimate of said location fix coordinates to be determined.

31. The method of claim 30, further comprising the step of minimizing said sphere radius in said M-dimensional space.

32. The method of claim 29, further comprising the steps of:

choosing said number N equal to M+2;

determining a sphere center and a sphere with minimum radius in an M-dimensional space that contains at least M+2 location fix coordinate N-tuples; and interpreting said location fix coordinates corresponding to the sphere center as an estimate of said location fix coordinates to be determined.

33. A method for determining the location of a location determination (LD) station, the method comprising the steps of:

receiving LD signals from N LD signal sources (N≧2) at an LD station and determining a pseudorange value between the LD station and each LD signal source, where the number of LD signal sources is greater than the number of location fix coordinates, M, for the LD station to be determined;

processing the pseudorange values to produce at least M−1 exact linear relations relating location fix coordinates for the LD station;

providing a selected sum of squares of the at least M−1 exact linear relations plus a square of a difference between the at least one selected pseudorange value and a selected one of the location fix coordinates;

processing the selected sum to obtain at least one additional linear relation relating the selected location fix coordinate to the at least M−1 location fix coordinates; and solving the at least M−1 linear relations plus the at least one additional linear relation to obtain values for the M location fix coordinates.

34. A method for determining the location of a location determination (LD) station, the method comprising the steps of:

receiving LD signals from N LD signal sources (N≧2) at an LD station and determining a pseudorange value between the LD station and each LD signal source, where the number of LD signal sources is less than the number of location fix coordinates, M, for the LD station to be determined;

processing the pseudorange values to produce at least N−1 exact linear relations relating location fix coordinates for the LD station;

using the at least N−1 linear relations together with at least one pseudorange value to obtain at least one exact non-linear relation relating at least first and second location fix coordinates; and using the at least one nonlinear relation to relate a first location fix coordinate to a second location fix coordinate.

35. The method of claim 34, wherein said steps of obtaining and using said at least one nonlinear relation further comprises the steps of:

choosing said number N=M−1;

obtaining said at least one nonlinear relation as a conical section that is an ellipse or an hyperbola, with coordinate axes for the conical section referenced to said first and second lines defined by said first and second linear relations; and using the conical section to relate said first location fix coordinate to said second location fix coordinate.

* * * * *